(12) United States Patent
Smiljanic et al.

(10) Patent No.: US 8,071,906 B2
(45) Date of Patent: Dec. 6, 2011

(54) APPARATUS FOR PRODUCING SINGLE-WALL CARBON NANOTUBES

(75) Inventors: Olivier Smiljanic, Montréal (CA);
Barry L. Stansfield, Saint-Bruno (CA);
Frederic Larouche, L'lle-Bizard (CA)

(73) Assignee: Institut National De La Recherche Scientifique, Quebec (CA)

( * ) Notice: Subject to any disclaimer, the term of this patent is extended or adjusted under 35 U.S.C. 154(b) by 1255 days.

(21) Appl. No.: 11/565,740

(22) Filed: Dec. 1, 2006

(65) Prior Publication Data

US 2010/0300358 A1    Dec. 2, 2010

Related U.S. Application Data

(62) Division of application No. 10/434,181, filed on May 9, 2003, now Pat. No. 7,591,989.

(30) Foreign Application Priority Data

May 9, 2002   (CA) ..................................... 2385802

(51) Int. Cl.
*B23K 10/00*   (2006.01)
(52) U.S. Cl. ......... 219/121.49; 219/121.47; 219/121.48; 118/723 R; 423/447.3
(58) Field of Classification Search ............. 219/121.43, 219/121.52, 121.48, 121.45, 121.36; 204/173; 423/447.3; 118/723 R, 723 I
See application file for complete search history.

(56) References Cited

U.S. PATENT DOCUMENTS

| | | |
|---|---|---|
| 4,490,229 A | 12/1984 | Mirtich et al. |
| 4,518,575 A | 5/1985 | Porter et al. |
| 4,572,813 A | 2/1986 | Arakawa |
| 4,582,254 A | 4/1986 | Rotolico et al. |
| 4,640,830 A | 2/1987 | Arakawa |
| 4,749,557 A | 6/1988 | Yetter et al. |
| 4,767,608 A | 8/1988 | Matsumoto et al. |
| 4,816,289 A | 3/1989 | Komatsu et al. |
| 4,876,078 A | 10/1989 | Arakawa et al. |
| 5,102,647 A | 4/1992 | Yamada |
| 5,147,998 A | 9/1992 | Tsantrizos et al. |
| 5,207,999 A | 5/1993 | Burk et al. |
| 5,217,747 A | 6/1993 | Tsantrizos et al. |
| 5,227,038 A | 7/1993 | Smalley et al. |

(Continued)

FOREIGN PATENT DOCUMENTS

AU       5335501        10/2001

(Continued)

OTHER PUBLICATIONS

Documents from litigation related to the corresponding Canadian patent application (CA 2,499,850).

(Continued)

*Primary Examiner* — Mark Paschall
(74) *Attorney, Agent, or Firm* — Bereskin & Purr LLP/S.E.N.C.R.L., s.r.l.

(57) ABSTRACT

There is provided an apparatus for producing single-wall carbon nanotubes. The apparatus comprises a plasma torch having a plasma tube adapted to receive an inert gas and form an inert gas plasma; a feeder adapted to direct a carbon-containing substance and a metal catalyst towards said inert gas plasma so that the carbon-containing substance and the metal catalyst contact said inert gas plasma downstream of where said inert gas is introduced in said plasma tube, to thereby form a plasma comprising atoms or molecules of carbon and the atoms of said metal; and a condenser for condensing the atoms or molecules of carbon and the atoms of said metal to form single-wall carbon nanotubes.

13 Claims, 8 Drawing Sheets

U.S. PATENT DOCUMENTS

| | | |
|---|---|---|
| 5,300,203 A | 4/1994 | Smalley |
| 5,346,683 A | 9/1994 | Green et al. |
| 5,395,496 A | 3/1995 | Tsantrizos et al. |
| 5,424,054 A | 6/1995 | Bethune et al. |
| 5,481,080 A | 1/1996 | Lynum et al. |
| 5,482,601 A | 1/1996 | Ohshima et al. |
| 5,486,674 A | 1/1996 | Lynum et al. |
| 5,493,094 A | 2/1996 | Simmons |
| 5,510,098 A | 4/1996 | Chow |
| 5,527,518 A | 6/1996 | Lynum et al. |
| 5,556,517 A | 9/1996 | Smalley |
| 5,587,141 A | 12/1996 | Ohshima et al. |
| 5,591,312 A | 1/1997 | Smalley |
| 5,593,740 A | 1/1997 | Strumban et al. |
| 5,611,896 A | 3/1997 | Swanepoel et al. |
| 5,641,466 A | 6/1997 | Ebbesen et al. |
| 5,684,218 A | 11/1997 | Webster |
| 5,744,657 A | 4/1998 | Webster |
| 5,753,088 A | 5/1998 | Olk |
| 5,773,834 A | 6/1998 | Yamamoto et al. |
| 5,788,738 A | 8/1998 | Pirzada et al. |
| 5,851,507 A | 12/1998 | Pirzada et al. |
| 5,876,684 A | 3/1999 | Withers et al. |
| 5,916,642 A | 6/1999 | Chang |
| 5,985,232 A | 11/1999 | Howard et al. |
| 5,989,648 A | 11/1999 | Phillips |
| 5,997,837 A | 12/1999 | Lynum et al. |
| 6,063,243 A | 5/2000 | Zettl et al. |
| 6,068,827 A | 5/2000 | Lynum et al. |
| 6,083,469 A | 7/2000 | Leftin |
| 6,099,696 A | 8/2000 | Schwob et al. |
| 6,149,775 A | 11/2000 | Tsuboi et al. |
| 6,156,256 A | 12/2000 | Kennel |
| 6,162,411 A | 12/2000 | Howard et al. |
| 6,171,451 B1 | 1/2001 | Miley et al. |
| 6,183,714 B1 | 2/2001 | Smalley et al. |
| 6,187,206 B1 | 2/2001 | Bernier et al. |
| 6,221,330 B1 | 4/2001 | Moy et al. |
| 6,254,940 B1 | 7/2001 | Pratsinis et al. |
| 6,261,484 B1 | 7/2001 | Phillips et al. |
| 6,261,532 B1 | 7/2001 | Ono |
| 6,303,094 B1 | 10/2001 | Kusunoki et al. |
| 6,331,209 B1 | 12/2001 | Jang et al. |
| 6,331,690 B1 | 12/2001 | Yudasaka et al. |
| 6,333,016 B1 | 12/2001 | Resasco et al. |
| 6,350,488 B1 | 2/2002 | Lee et al. |
| 6,358,375 B1 | 3/2002 | Schwob |
| 6,361,861 B2 | 3/2002 | Gao et al. |
| 6,382,526 B1 | 5/2002 | Reneker et al. |
| 6,395,197 B1 | 5/2002 | Detering et al. |
| 6,426,134 B1 | 7/2002 | Lavin et al. |
| 6,444,864 B1 | 9/2002 | Knight et al. |
| 6,455,021 B1 | 9/2002 | Saito |
| 6,495,114 B1 | 12/2002 | Debras |
| 6,495,116 B1 | 12/2002 | Herman |
| 6,518,218 B1 | 2/2003 | Sun et al. |
| 6,645,455 B2 | 11/2003 | Margrave et al. |
| 6,683,783 B1 | 1/2004 | Smalley et al. |
| 6,686,311 B2 | 2/2004 | Sun et al. |
| 6,692,717 B1 | 2/2004 | Smalley et al. |
| 6,730,284 B2 | 5/2004 | Harutyunyan et al. |
| 6,749,827 B2 | 6/2004 | Smalley et al. |
| 6,752,977 B2 | 6/2004 | Smalley et al. |
| 6,756,025 B2 | 6/2004 | Colbert et al. |
| 6,756,026 B2 | 6/2004 | Colbert et al. |
| 6,761,870 B1 | 7/2004 | Smalley et al. |
| 6,787,200 B1 | 9/2004 | Delaunay et al. |
| 6,790,425 B1 | 9/2004 | Smalley et al. |
| 6,824,755 B2 | 11/2004 | Colbert et al. |
| 6,827,918 B2 | 12/2004 | Margrave et al. |
| 6,835,366 B1 | 12/2004 | Margrave et al. |
| 6,841,002 B2 | 1/2005 | Kang et al. |
| 6,841,003 B2 | 1/2005 | Kang et al. |
| 6,841,139 B2 | 1/2005 | Mangrave et al. |
| 6,852,410 B2 | 2/2005 | Veedu et al. |
| 6,855,301 B1 | 2/2005 | Rich et al. |
| 6,875,412 B2 | 4/2005 | Margrave et al. |
| 6,887,291 B2 | 5/2005 | Alford et al. |
| 6,899,945 B2 | 5/2005 | Smalley et al. |
| 6,900,264 B2 | 5/2005 | Kumar et al. |
| 6,913,789 B2 | 7/2005 | Smalley et al. |
| 6,919,064 B2 | 7/2005 | Resasco et al. |
| 6,936,233 B2 | 8/2005 | Smalley et al. |
| 6,936,653 B2 | 8/2005 | McElrath et al. |
| 6,939,525 B2 | 9/2005 | Colbert et al. |
| 6,949,237 B2 | 9/2005 | Smalley et al. |
| 7,303,790 B2 | 12/2007 | Delaunay et al. |
| 2001/0009693 A1 | 7/2001 | Lee et al. |
| 2001/0031900 A1 | 10/2001 | Margrave et al. |
| 2001/0041160 A1 | 11/2001 | Margrave et al. |
| 2001/0050219 A1 | 12/2001 | Anazawa et al. |
| 2002/0004028 A1 | 1/2002 | Margrave et al. |
| 2002/0018745 A1 | 2/2002 | Herman |
| 2002/0031465 A1 | 3/2002 | Saito |
| 2002/0046872 A1 | 4/2002 | Smalley et al. |
| 2002/0048632 A1 | 4/2002 | Smalley et al. |
| 2002/0068170 A1 | 6/2002 | Smalley et al. |
| 2002/0084410 A1 | 7/2002 | Colbert et al. |
| 2002/0085968 A1 | 7/2002 | Smalley et al. |
| 2002/0086124 A1 | 7/2002 | Margrave et al. |
| 2002/0088938 A1 | 7/2002 | Colbert et al. |
| 2002/0090330 A1 | 7/2002 | Smalley et al. |
| 2002/0090331 A1 | 7/2002 | Smalley et al. |
| 2002/0090468 A1 | 7/2002 | Goto et al. |
| 2002/0092983 A1 | 7/2002 | Colbert et al. |
| 2002/0092984 A1 | 7/2002 | Colbert et al. |
| 2002/0094311 A1 | 7/2002 | Smalley et al. |
| 2002/0096634 A1 | 7/2002 | Colbert et al. |
| 2002/0098135 A1 | 7/2002 | Smalley et al. |
| 2002/0102193 A1 | 8/2002 | Smalley et al. |
| 2002/0102194 A1 | 8/2002 | Smalley et al. |
| 2002/0102196 A1 | 8/2002 | Smalley et al. |
| 2002/0102201 A1 | 8/2002 | Colbert et al. |
| 2002/0102203 A1 | 8/2002 | Smalley et al. |
| 2002/0109086 A1 | 8/2002 | Colbert et al. |
| 2002/0109087 A1 | 8/2002 | Colbert et al. |
| 2002/0110513 A1 | 8/2002 | Margrave et al. |
| 2002/0127162 A1 | 9/2002 | Smalley et al. |
| 2002/0127169 A1 | 9/2002 | Smalley et al. |
| 2002/0127171 A1 | 9/2002 | Smalley et al. |
| 2002/0136681 A1 | 9/2002 | Smalley et al. |
| 2002/0136683 A1 | 9/2002 | Smalley et al. |
| 2002/0150524 A1 | 10/2002 | Smalley et al. |
| 2002/0159943 A1 | 10/2002 | Smalley et al. |
| 2002/0159944 A1 | 10/2002 | Smalley et al. |
| 2002/0172767 A1 | 11/2002 | Grigorian et al. |
| 2002/0197474 A1 | 12/2002 | Reynolds |
| 2003/0010910 A1 | 1/2003 | Colbert et al. |
| 2003/0064169 A1 | 4/2003 | Hong et al. |
| 2003/0066960 A1 | 4/2003 | Colbert et al. |
| 2003/0075682 A1 | 4/2003 | Colbert et al. |
| 2003/0082094 A1 | 5/2003 | Loutfy et al. |
| 2003/0104933 A1 | 6/2003 | Sun et al. |
| 2003/0104934 A1 | 6/2003 | Sun et al. |
| 2003/0106998 A1 | 6/2003 | Colbert et al. |
| 2003/0108478 A1 | 6/2003 | Hiraoka et al. |
| 2003/0113714 A1 | 6/2003 | Belcher et al. |
| 2003/0133865 A1 | 7/2003 | Smalley et al. |
| 2003/0147802 A1 | 8/2003 | Smalley et al. |
| 2003/0170166 A1 | 9/2003 | Smalley et al. |
| 2003/0175200 A1 | 9/2003 | Smalley et al. |
| 2003/0211028 A1 | 11/2003 | Smalley et al. |
| 2003/0211030 A1 | 11/2003 | Smiljanic et al. |
| 2003/0215380 A1 | 11/2003 | Yang et al. |
| 2003/0224114 A1 | 12/2003 | Yang |
| 2004/0005269 A1 | 1/2004 | Huang et al. |
| 2004/0009114 A1 | 1/2004 | Margrave et al. |
| 2004/0013598 A1 | 1/2004 | McElrath et al. |
| 2004/0022981 A1 | 2/2004 | Hu et al. |
| 2004/0038251 A1 | 2/2004 | Smalley et al. |
| 2004/0040834 A1 | 3/2004 | Smalley et al. |
| 2004/0045808 A1 | 3/2004 | Fabry et al. |
| 2004/0053440 A1 | 3/2004 | Lai et al. |
| 2004/0149209 A1 | 8/2004 | Dai et al. |
| 2004/0150312 A1 | 8/2004 | McElrath et al. |
| 2004/0179989 A1 | 9/2004 | Height et al. |
| 2004/0183220 A1 | 9/2004 | Dalmia |

| | | | |
|---|---|---|---|
| 2004/0197638 A1 | 10/2004 | McElrath et al. | |
| 2004/0223901 A1 | 11/2004 | Smalley et al. | |
| 2004/0234444 A1 | 11/2004 | Shaffer et al. | |
| 2004/0241080 A1 | 12/2004 | Nagy et al. | |
| 2004/0245088 A1 | 12/2004 | Gardner | |
| 2004/0250753 A1 | 12/2004 | Kang et al. | |
| 2004/0253167 A1 | 12/2004 | Silva et al. | |
| 2004/0258603 A1 | 12/2004 | Yakobson et al. | |
| 2004/0265209 A1 | 12/2004 | Colbert et al. | |
| 2005/0002851 A1 | 1/2005 | McElrath et al. | |
| 2005/0025696 A1 | 2/2005 | Resasco et al. | |
| 2005/0042162 A1 | 2/2005 | Resasco et al. | |
| 2005/0074392 A1 | 4/2005 | Yang et al. | |
| 2005/0089467 A1 | 4/2005 | Grill et al. | |
| 2005/0100497 A1 | 5/2005 | Smalley et al. | |
| 2005/0106094 A1 | 5/2005 | Kondo | |
| 2005/0118090 A1 | 6/2005 | Shaffer et al. | |
| 2005/0123467 A1 | 6/2005 | Harutyunyan | |
| 2005/0171281 A1 | 8/2005 | Hwang et al. | |

FOREIGN PATENT DOCUMENTS

| | | |
|---|---|---|
| CA | 2010887 | 8/1991 |
| CA | 2085133 | 10/1992 |
| CA | 2231367 | 3/1997 |
| CA | 2283502 | 9/1998 |
| CA | 2344180 | 3/2000 |
| CA | 2344577 | 3/2000 |
| CA | 2350099 | 5/2000 |
| CA | 2375887 | 12/2000 |
| CA | 2368043 | 5/2001 |
| CA | 2331278 | 8/2001 |
| CA | 2395243 | 10/2001 |
| CA | 2405176 | 11/2001 |
| CA | 2410934 | 12/2001 |
| CA | 2419941 | 3/2002 |
| CA | 2424969 | 4/2002 |
| CA | 2439314 | 10/2002 |
| CA | 2445169 | 10/2002 |
| CA | 2451080 | 1/2003 |
| CA | 2461898 | 4/2003 |
| CA | 2462067 | 4/2003 |
| CA | 2504214 | 5/2004 |
| CA | 2505996 | 6/2004 |
| CA | 2507992 | 6/2004 |
| CA | 2518848 | 9/2004 |
| CA | 2519610 | 9/2004 |
| EP | 1046613 | 10/2000 |
| EP | 1061043 | 12/2000 |
| EP | 1072693 | 1/2001 |
| EP | 1129990 | 9/2001 |
| JP | 605414 | 3/1994 |
| JP | 7061803 | 3/1995 |
| JP | H09188509 | 7/1997 |
| JP | 2737736 | 5/2003 |
| WO | WO 93/01128 | 1/1993 |
| WO | WO 93/12030 | 6/1993 |
| WO | WO 93/20151 | 10/1993 |
| WO | WO 93/20152 | 10/1993 |
| WO | WO 93/20153 | 10/1993 |
| WO | WO 9323331 | 11/1993 |
| WO | WO 9404461 | 3/1994 |
| WO | WO 94/14899 | 7/1994 |
| WO | WO 9709272 | 3/1997 |
| WO | WO 97/22556 | 6/1997 |
| WO | WO 99/65821 | 12/1999 |
| WO | WO 01/16023 | 3/2001 |
| WO | WO 01/34518 | 5/2001 |
| WO | WO 01/49599 | 7/2001 |
| WO | WO 01/61719 | 8/2001 |
| WO | WO 0177015 | 10/2001 |
| WO | WO 03038163 | 5/2003 |
| WO | WO 03062146 | 7/2003 |

OTHER PUBLICATIONS

Letter to the Commissioner of Patents & Trademarks.

Soucy et al., "Heat and mass transfer during in-flight nitridation of molybdenum disilicide powder in an induction plasma reactor", Materials Science and Engineering, A300, 2001, pp. 226-234.

Tanaka et al., "Compositional modification of boron carbide induced by induction plasma treatment", Thin Solid Films 345, 1999, pp. 156-160.

Yargeau et al., "The treatment of water-based toxic waste using induction plasma technology", Plasma Chemistry and Plasma Processing, 1999, vol. 10, No. 3, pp. 327-340.

Davies et al., "Experimental study of heat and mass transfer in a high-frequency thermal plasma reactor", IEEE Transactions on Plasma Science, Oct. 1997, vol. 25, No. 5, pp. 1052-1057.

Désilets et al., "Modeling of multicomponent diffusion in high temperature flows", Int. J. Heat Mass Transfer, 1997, vol. 40, No. 18, pp. 4273-4278.

Rahmane et al., "Diffusion phenomena of a cold gas in a thermal plasma stream", Plasma Chemistry and Plasma Processing., 1996, vol. 16, No. 1, pp. 169S-178S.

Soucy et al., "Parametric study of the decomposition of NH3 for an induction plasma reactor design", Plasma Chemistry and Plasma Processing, 1995, vol. 15, No. 4, pp. 693-710.

Soucy et al., "Mixing study of the induction plasma reactor: Part I. Axial Injection Mode", Plasma Chemistry and Plasma Processing, 1994, vol. 14., No. 1, pp. 43-58.

Soucy et al., "Mixing study of the induction plasma reactor: Part II. Radial Injection Mode", Plasma Chemistry and Plasma Processing, 1994, vol. 14., No. 1, pp. 59-71.

Yargeau et al., "The treatment of water-based toxic waste using induction plasma technology", Plasma Chemistry and Plasma Processing, 1999, vol. 19, No. 3, pp. 327-340.

Rahmane et al., "Analysis on the enthalpy probe technique for thermal plasma diagnostics", Rev.Sci.Instr. 1995, pp. 3424-3431.

Soucy et al., "Parametric study of the plasma synthesis of ultrafine silicon nitride powers", Journal of Materials Science, 1995, pp. 2008-2018.

Rahmane et al., "Mass transfer in induction plasma reactors", Int. J. Heat Mass Transfer, 1994, vol. 37, No. 14, pp. 2035-2046.

Pacheco-Sotelo et al., "Plasma torch ignition by a half bridge resonant converter", IEEE Transactions on Plasma Science, Aug. 1999, vol. 27, No. 4, pp. 1124-1130.

Maher Boulos, New Frontiers in Thermal Plasma Processing, Pure & Appl. Chem., 1996, pp. 1007-1010, vol. 68, No. 5, GB. (Relevant pp. All).

A. Czernichowski, High-Frequency Electrodeless Plasmatrons and Their Use in Chemistry and Material Engineering, ICP Information Newsletter, Jul. 1976, pp. 1-46, Sp. Issue No. 1, US. (Relevant pp. Section 3).

J.Y. Guo et al., Induction Plasma Synthesis of Ultrafine SiC Powders from Silicon and CH4, Journal of Materials Science 30, 1995, pp. 5589-5599, CA. (Relevant pp. All).

M. Boulos et al., Fundamentals of Materials Processing Using Thermal Plasma Technology, Short Course, Canadian University-Industry Council on Advanced Ceramics, Oct. 1989, pp. 1-358, CA. (Relevant pp. Sections 3, 5-7).

T. Hussain et al., Synthesis of Ultra-Fine Silicone Nitride in an R.F. Plasma Reactor, ISPC-7 Eindhoven, Jul. 1985, pp. 692-697, GB. (Relevant pp. All).

M. Boulos, New Frontiers in Material Processing Using Thermal Plasma Technology, High Energy Density Technologies in Materials Science, 1990, pp. 49-64, Netherlands. (Relevant pp. All).

M. Boulos, Preparation of Ultrafine Silicon Nitride Powders Using R.F. Plasma Technology, CEA No. 717 U 635, Dec. 1990, pp. 1-90, CA. (Relevant pp. 1-14, 27-36).

F. Gitzhofer, Industion Plasma Synthesis of Ultrafine SiC, Pure & Appl. Chem., 1996, pp. 1113-1120, vol. 68, No. 5, GB. (Relevant pp. 1114-1117).

M.I. Boulos, R.F. Induction Plasma Spraying: State-of-the-Art Review, Journal of Thermal Spray Technology, Mar. 1992, pp. 33-40, vol. 1(1). (Relevant pp. Sections 2, 4).

M. Desilets, Mixing Study in an Inductive Plasma Reactor: Comparison Between Model Calculations and Experimental Results, The Canadian Journal of Chemical Engineering, Aug. 1998, pp. 707-716, vol. 76, CA. (Relevant pp. 707-710).

G.Soucy et al., Design of an Induction Plasma Reactor for the Reforming of Aromatic Liquid Wastes, High Temp. Material Processes 2, 1998, pp. 195-206, CA. (Relevant pp. All).

R. Li et al., Modeling of Unsteady Flow Around Accelerating Sphere at Moderate Reynolds Numbers, The Canadian Journal of Chemical Engineering, Dec. 1993, pp. 837-844, vol. 71, CA. (Relevant pp. 837-838).

K. Chen et al., Turbulence in Induction Plasma Modelling, J. Phys. D: Appl. Phys. 27, 1994, pp. 946-952, UK. (Relevant pp. 946-947).

Z. Njah et al., Study of 3-D Mixing of a Cold Jet with a Transverse Plasma Stream, Int. J. Heart Mass Transfer, 1993, pp. 3897-3907, vol. 36, No. 16, GB. (Relevant pp. 3897-3899 and 3901-3906).

Z. Njah et al., Mathematical Modelling of the 3-D Mixing in an Induction Plasma Reactor, Int. J. Heart Mass Transfer, 1993, pp. 3909-3919, vol. 36, No. 16, GB. (Relevant pp. 3909-3911).

E. Bergeron et al., Reforming of Toxic Liquid Wastes in an Induction Plasma Reactor, Plasma Technology Research Center (CRTP), Dept. of Chem. Engineering, 1997, pp. 417-424, CA. (Relevant pp. 417-420).

M. Rahmane et al., Heat and Mass Transfer Under Thermal Plasma Conditions, Recent Res. Devel. Heat, Mass & Momentum Transfer, 1999, pp. 103-120, vol. 2. (Renevant pp. 103-105 and 108).

T. Yoshida et al., Characterization of a Hybrid Plasma and its Application to a chemical Synthesis, J. Appl. Phys.,Feb. 1983, pp. 640-646, vol. 54, No. 2, USA. Relevant pp. 640-641, 644-646).

M. El-Hage et al., A Turbulent Flow Model for the rf Inductively Coupled Plasma, J. Appl. Phys., Jun. 1989, pp. 4178-4185, vol. 65 (11), USA. (Relevant pp. All).

X. Fan et al., Journal of Thermal Spray Technology, Jun. 1998, pp. 247-253, vol. 7(2). (Relevant pp. All).

X. Chen et al., Modeling of RF Plasma Torch with a Metallic Tube Inserted for Reactant Injection, Plasma Chemistry & Plasma Processing, 1991, pp. 103-128, vol. 11, No. 1. (Relevant pp. 103-104).

R. Ye et al., Turbulence Phenomena in the Radio Frequency Induction Plasma Torch, Int'l Journal of Heat and Mass Transfer, 1999, pp. 1585-1595, vol. 42. (Relevant sections: 1, 3-5).

J.Y. Guo et al., Effects of Process Parameters on Ultrafine SiC Synthesis Using Induction Plasmas, Plasma Chemistry and Plasma Processing, 1997, pp. 219-249, vol. 17, No. 2. (Relevant pp. 219, 224-228, 234-236, 241-245).

R. Sen et al., Carbon Nanotubes by the Metallocene Route, Chemical Physics Letters, Mar. 1997, pp. 276-280, vol. 267. (Relevant pp. All).

D. Laplaze et al., Carbon 40, pp. 1621-1634, (2002).

A. A. Puretzky et al., Physical Review B 65, art-245425, (Jun. 2002).

M. Castignolles et al., Combined Experimental and Numerical Study of Parameters Controlling C-SWNTs (HNT) Synthesis via Laser Vaporization, CP633, Structural and Electronic Properties of Molecular Nanostructures, edited by H. Kuzmany et al., pp. 385-389, 2002.

An English abstract of CN 1328958 "Preparation of carbon nanometer pipe material and its equipment", Jan. 2, 2002.

An English abstract of JP 2001348215 "Manufacturing method of carbon nanotube and/or fullerene and manufacturing device thereof", Dec. 18, 2001.

An English abstract of JP 2003054924 "Method and apparatus of producing fullerene and carbon nanotube", Feb. 26, 2003.

An English abstract of JP 2003530235 "Net shape manufacturing using carbon nanotunes", Oct. 14, 2003.

An English abstract of JP 7061803 "Production of fullerene and carbon nanotube", Mar. 7, 1995.

An English abstract of JP 9188509 "Production of monolayer carbon nanotube", Jul. 22, 1997.

Liu, C. et al., "Hydrogen Storage in Single-Walled Carbon Nanotubes at Room Temperature", Science, vol. 286, Nov. 5, 1999, pp. 1127-1129.

Dresselhaus, K.A. et al., "Hydrogen Adsorption in Carbon Materials", MRS Bulletin, Nov. 1999, pp. 45-50.

Menon, M. et al., "Carbon Nanotube T Junctions: Naonscale Metal-Semiconductor-Metal Contact Devices", Phys. Rev. Lett., 1997, pp. 4453-4456.

Puretzky, A.A. et al., "Dynamics of single-wall carbon nanotube synthesis by laser vaporization", App. Pys., A. 2000, pp. 153-160.

Smalley, R E. et al., "Catalytic growth of single-wall carbon nanotubes from metal particles", Chem. Pys. Let., 1998, pp. 195-202.

Smiljanic, O. et al., "Gas-phase synthesis of SWNT by an atmospheric pressure plasma jet", Chem. Phys. Let., 2002, pp. 189-193.

Karachevtsev, V.A. et al., "Raman spectroscopy of HiPCO single-walled carbon nanotubes at 300 and 5 K", Carbon, 2003, pp. 1567-1574.

Harbec, D. et al., "Carbon nanotubes from the dissociation of C2Cl4 using a DC thermal plasma torch", Journal of Physics: Applied Physics, vol. 37, Jul. 14, 2004, pp. 2121-2126.

Andrews, R. et al., "Continuous production of aligned carbon nanotubes: a step closer to commercial realization", Chemical Physics Letters, vol. 303, Apr. 16, 1999, pp. 467-474.

Shi, Z et al., "Large scale synthesis of single-wall carbon nanotubes by arc-discharge method", Journal of Physics and Chemistry of Solids, vol. 61, 2000, pp. 1031-1036.

Harris, P.J.F., "Fullerene-related structure of commercial glassy carbons", Philosophical Magazine, vol. 84, No. 29, Oct. 11, 2004, pp. 3159-3167.

Smiljanic et al., "Gas phase synthesis of SWNT in an atmospheric pressure plasma jet", Nanotube-2001, International Workshop on the Science and Application of Nanotubes, Jul. 22, 2001, Potsdam, Germany.

Sarkissian, A.H., et al. "Characterization of diffused ECR plasma-application to pulsed plasma ion implantation of nitrogen in titanium", Surface and Coatings technology, Jan. 1998, vol. 98, pp. 1336-1340.

Smiljanic et al., "Growth of carbon nanotubes on Ohmically heated carbon paper", Chemical Physics letters, Jul. 20, 2001, vol. 342, pp. 503-509.

Ebbesen et al., "Large-scale synthesis of carbon nanotubes", Nature, 1992, vol. 358, pp. 220-222.

Bethune et al., Cobalt-catalysed growth of carbon nanotubes with single-atomic layer walls:, Nature, 1993, vol. 363, pp. 605-607.

Hubert et al., "An atmospheric pressure waveguide-fed microwave plasma torch: the TIA design", Plasma Sources Sci. Technol., 1994, pp. 584-592.

Journet et al., "Large-scale production of single-walled carbon nanotubes by the electric-arc technique", Nature, 1997, vol. 388, pp. 756-758.

Philips et al., "Restructuring of alumina particles using a plasma torch", J. Mat. Res.,1999, vol. 14 No. 3, pp. 849-854.

Soucy et al., "Production of carbon nanostructures using a HF plasma torch", Proc. 15th International Symposium on Plasma Chemistry, Orleans, France, 2001, pp. 515-520.

Simard et al., "Recent advances in carbon nanotubes technologies at the National Research Council", Proceedings of the 11th Canadian Hydrogen Conference, 2001, pp. 1-8.

Chun-Ku et al., "Low-power plasma torch method for the produciton of crystalline spherical ceramic particles", J.Mat. Res., 2001, vol. 16, pp. 1256-1265.

Wei-Fang Du et al., "Investigation of the pore structure of as-prepared and purified HiPco single-walled carbon nanotubes by N2/Ar adsorption implication for H2 storage", Nano Letters, 2002, vol. 2, No. 4, pp. 343-346.

Yang et al., "Charge-discharge characteristics of raw acid-oxidized carbon nanotubes", Electrochemistry Communications 4, 2002, pp. 574-578.

Yang et al., "Effects of doped coper on electrochemical performance of the raw carbon nanotubes anode", Materials Letters 57, 2003, pp. 3160-3166.

Tekna Plasma Torch brochures.

Nikkiso Co., A Continuous Process for Producing Carbon Nanotubes, Chemical Engineering, Dec. 2001, p. 19. (Relevant pp. Sections 1-2).

Y. Saito, Nanoparticles and Filled Nanocapsules, Carbon (Elsevier Science Ltd.), 1995, pp. 979-988, vol. 33, No. 7, GB. (Relevant pp. Sections 1, 2, 4).

C. Kiang et al., Catalytic Effects of Heavy Metals on the Growth of Carbon Nanotuves and Nanoparticles, J. Phys. Chem. Solids, 1996, pp. 35-39, vol. 57, No. 1, GB. (Relevant pp. All).

A.G. Rinzler et al., Large-Scale Purification of Single-Wall Carbon Nanotubes: Process, Product, and Characterization, Appl. Phys. A., 1998, pp. 29-37, vol. 67. (Relevant pp. Section 1).

M. Holzinger et al., A New Purification Method for Single-Wall Carbon Nanotubes, Appl. Phys. A, 2000, pp. 599-602, vol. 70. (Relevant pp. All).

An English Abstract of DE19946182, Production of Carbon Nanotubes Used in Microelectronics Comprises Focusing Laser Pulses Onto Surface of Carbon-Containing Material, vaporizing and Decomposing Carbon-Containing Molecules and Growing Carbon Nanotubes, Mar. 2001, Forschungsverbund Berlin EV (DE). (Relevant pp. All).

An English Abstract of RU2146648, Method of Preparing Carbon Nanotubes, Mar. 2000, Institut Kataliza Im. G.K. Boreskova SO RAN (RU). (Relevant pp. All).

A. Czernichowski et al., High-Frequency Electrodeless Plasmatrons and Their Use in Chemistry and Material Engineering, ICP Information Newsletter, Jul. 1976, pp. 1-46, vol. 2, Sp. Issue 1, U.S.A. (Relevant pp. 25-40).

Eckert, "Analysis of Thermal Induction Plasmas Dominated by Radial Conduction Losses", J. of Applied Physics, 1970, vol. 41, pp. 1520-1528.

Boulos, "The Inductively Coupled R.F. (radio frequency) Plasma", Pure & Appl. Chem., 1985, vol. 57, pp. 1321-1352.

Boulos, "The Inductively Coupled Radio Frequency Plasma", High Temp. Material Processes, 1997, pp. 17-39.

Huczko et al., "Influence of Fe and Co/Ni on Carbon Arc Plasma and Formation of Fullerenes and Nanotubes", J. Phys. Chem. A 104(46), 2000, pp. 10708-10712.

Guddeti et al., "Depolymerization of Polypropylene in an Induction-Coupled Plasma (ICP) Reactor", Ind. Eng. Chem. Res, 2000, 39, 1171-1176.

Guddeti et al., "Depolymerization of Polyethylene Using Induction-Coupled Plasma Technology", Plasma Chemistry and Plasma Processing, 2000, vol. 20, No. 1, 37-64.

Boulos, "Thermal Plasma Processing", IEEE Transactions on Plasma Science, 1991, vol. 19, No. 6, 1078-1089.

Klotz et al., "Synthesis and Characterization of Nanoscaled and Nanostructured Carbon Containing Materials Produced by Thermal Plasma Technology", Applied Surface Science, 2001, 179, 1-7.

Koshio et al., "Metal-free Production of High-quality Multi-wall Carbon Nanotubes, in which the Innermost Nanotubes Have a Diameter of 0.4 nm", Chemical Physics Letters, 2002, 356, 595-600.

Takikawa et al., "Fabrication of Single-walled Carbon Nanotubes and Nanohorns by Means of a Torch Arc in Open Air", Physica B, 2002, 323, 277-279.

Chen et al., "New Method of Carbon Onion Growth by Radio-frequency Plasma-enhanced Chemical Vapor Deposition", Chemical Physics Letters, 2001, 336, 201-204.

Boulos, "Radio Frequency Plasma Developments, Scale-up and Industrial Applications", High Temp. Chem. Processes, 1992, pp. 401-411.

Scott, "Carbon Coated Nanoparticle Composites Synthesized in an RF Plasma Torch", Mat. Res. Soc. Symp. Proc., 1997, vol. 457, pp. 219-224.

Alexakis et al., "Synthesis of Fullerenes Via the Thermal Plasma Dissociation of Hydrocarbons", Appl. Phys. Lett., 1997, vol. 70, pp. 2102-2104.

Yoshie et al., "Novel Method for C60 Synthesis: A Thermal Plasma at Atmospheric Pressure", Appl. Phys. Lett., 1992, vol. 61, pp. 2782-2783.

Bolouri et al., "Reactor Design and Energy Concepts for a Plasma Process of Acetylene Black Production", Plasma Chemistry and Plasma Processing, 1986, vol. 6, pp. 335-348.

Bolouri et al., "Acetylene Black Production on a Plasma Pilot Plant", ISPC-6, 1983, pp. 247-252.

Fincke et al., "Plasma Pyrolysis of Methane to Hydrogen and Carbon Black", Ind. Eng. Chem. Res., 2002, vol. 41, pp. 1425-1435.

Cota-Sanchez et al., "Production of Carbon Nanostructures Using a HF Plasma Torch", Plasma Technology Center, Dept. Of Chem. Eng., Universitéde Sherbrooke, Qc., Canada and Depart. Chem., University of Warsaw, Poland, pp. 515-520.

Wang et al., "Synthesis of Fullerenes from Carbon Powder by Using High Power Induction Thermal Plasma", Thin Solid Films 390, 2001, pp. 31-36.

Fulcheri et al., "Fullerene Production in a 3-Phase AC Plasma Process", Carbon 38, 2000, pp. 797-803.

Ando et al., "Mass Production of Single-Wall Carbon Nanotubes by the Arc Plasma Jet Method", Chemical Physics Letters 323, 2000, pp. 580-585.

Guo et al., "Catalytic Growth of Single-Walled Nanotubes by Laser Vaporization", Chemical Physics Letters 243, 1995, pp. 49-54.

Flahaut et al., "Synthesis of Single-Walled Carbon Nanutobes Using Binary (Fe, Co, Ni) Alloy Nanoparticles Prepared In Situ by the Reduction of Oxide Solid Solutions", Chemical Physics Letters 300, 1999, pp. 236-242.

Kitiyanan et al., "Controlled Production of Single-Wall Carbon Nanotubes by Catalytic Decomposition of CO on Bimetallic Co-Mo Catalysts", Chemical Physics Letters 317, 2000, pp. 497-503.

Cheng et al., "Large-Scale and Low-Cost Synthesis of Single-Walled Carbon Nanotubes by the Catalytic Pyrolysis of Hydrocarbons", Appl. Phys. Lett., 1998, vol. 72, pp. 3282-3284.

Nikolaev et al., "Gas-Phase Catalytic Growth of Single-Walled Carbon Nanotubes from Carbon Monoxide", Chemical Physics Letters 313, 1999, pp. 91-97.

Sen et al., "Metal-Filled and Hollow Carbon Nanotubes Obtained by the Decomposition of Metal-Containing Free Precursor Molecules", Chem. Mater., 1997, pp. 2078-2081.

Satishkumar et al., "Bundles of Aligned Carbon Nanotubes Obtained by the Pyrolysis of Ferrocene-Hydrocarbon Mixtures: Role of the Metal Nanoparticles Produced In Situ", Chemical Physics Letters 307, 1999, pp. 158-162.

Li et al., "Structure and Growth of Aligned Carbon Nanotube Films by Pyrolysis", Chemical Physics Letters 316, 2000, pp. 349-355.

Fulcheri et al., "A 3-Phase A.C. Plasma Process for Carbon Black Production from Methane", VDI Berichte Nr. 1166, 1995, pp. 525-532.

Wang et al., "Silicon Inclusion Effect on Fullerene Formation under Induction Thermal Plasma Condition", Thin Solid Films 407, 2002, pp. 72-78.

Cheng et al., "Bulk Morphology and Diameter Distribution of Single-Walled Carbon Nanotubes Synthesized by Catalytic Decomposition of Hydrocarbons", Chemical Physics Letters 289, 1998, pp. 602-610.

Fonseca et al., "Synthesis of Single-and Multi-Wall Carbon Nanutobes Over Supported Catalysts", Appl. Phys.A, 1998, A67, pp. 11-22.

Hernadi et al., "Fe-Catalyzed Carbon Nanotube Formation", Carbon, 1996, vol. 34, pp. 1249-1257.

Jost et al., "Rate-Limiting Processes in the Formation of Single-Wall Carbon Nanotubes: Pointing the Way to the Nanotube Formation Mechanism", J. Phys. Chem., 2002, vol. 106, pp. 2875-2883.

Liu et al., "Synthesis and Characterization of Single-Walled Nanotubes Produced with Ce/Ni as Catalysts", Chemical Physics Letters 320, 2000, pp. 365-372.

Scott et al., "Growth Mechanism for Single-Wall Carbon Nanotubes in a Laser-Ablation Process", Appl. Phys., 2001, vol. 72, pp. 573-580.

Takizawa et al., "Change of Tube Diameter Distribution of Single-Wall Carbon Nanotubes Induced by Changing the Bimetallic ratio of Ni and Y Catalysts", Chemical Physics Letters 326, 2000, pp. 351-357.

Lijima et al., "Single-Shell Carbon Nanotubes of 1-nm Diameter", Nature, 1993, vol. 363, pp. 603-604.

Huczko et al., "Plasma Synthesis of Nanocarbons", High Temp. Material Processes, 2002, pp. 369-384.

Lange et al., "Studies of Carbon Arc Plasma Doped with Fe and Co/Ni During the Formation of Carbon Nanostructures", Proceedings 14th Int'l Symposium on Plasma Chemistry, 1999, vol. IV, pp. 2241-2246.

Zhang et al., "Single-Wall Carbon Nanutobes: a High Yield of Tubes Through Laser Ablation of a Crude-Tube Target", Chemical Physics Letters 336, 2001, pp. 196-200.

Chen et al., "Carbon Nanotubes: A Future Material of Life", Life, 2000, vol. 49, pp. 105-108.

Tsai et al., "Bias-Enhanced Nucleation and Growth of the Aligned Carbon Nanotubes with Open Ends Under Microwave Plasma Synthesis", Applied Physics Letters, 1999, vol. 74, pp. 3462-3464.

Qin et al., "Growing Carbon Nanotubes by Microwave Plasma-Enhanced Chemical Vapor Deposition", Applied Physics Letters, 1998, vol. 72, pp. 3437-3439.

Okai et al., "Structure of Carbon Nanotubes Grown by Microwave-Plasma-Enhanced Chemical Vapor Deposition", Applied Physics Letters, 2000, vol. 77, pp. 3468-3470.

Conrads et al., "Plasma Generation and Plasma Sources", Plasma Sources Sci. Technol., 2000, pp. 441-454.

Choi et al., "Effect of Surface Morphology of Ni Thin Film on the Growth of Aligned Carbon Nanotubes by Microwave Plasma-Enhanced Chemical Vapor Deposition", J. Applied Physics, 2000, vol. 88, pp. 4898-4903.

Wang et al., "Nucleation and Growth of Well-Aligned, Uniform-Sized Carbon Nanotubes by Microwave Plasma Chemical Vapor Deposition", Applied Physics Letters, 2001, vol. 78, pp. 4028-4030.

Murakami et al., "Field Emission from Well-Aligned, Patterned, Carbon Nanotube Emitters", Applied Physics Letters, 2000, vol. 76, pp. 1776-1778.

Bower et al., "Plasma-Induced Alignment of Carbon Nanotubes", Applied Physics Letters, 2000, vol. 77, pp. 831-832.

Delzeit et al., "Growth of Multiwall Carbon Nanotubes in an Inductively Coupled Plasma Reactor", J. Applied Physics, 2002, vol. 91, pp. 6027-6033.

Diener et al., "Development of Combustion Synthesis Methods for Fullerenes and SWNTs", NanoSpace 2001—Exploring Interdisciplinary Frontiers, 2001, p. 40.

Reed, "Induction-Coupled Plasma Torch", J. of Applied Physics, 1961, vol. 32, pp. 821-824.

Freeman et al., "Energy-Transfer Mechanism and Typical Operating Characteristics for the Thermal rf Plasma Generator", J. of Applied Physics, 1968, vol. 39, pp. 180-190.

FIG_1

FIG_2

FIG_3

FIG_4

APPARATUS FOR PRODUCING SINGLE-WALL CARBON NANOTUBES

CROSS-REFERENCE TO RELATED APPLICATIONS

This application is a divisional application of U.S. application Ser. No. 10/434,181 filed on May 9, 2003, which claims priority on Canadian Patent Application No. 2,385,802 filed on May 9, 2002. The above-mentioned applications are incorporated herein by reference in their entirety.

FIELD OF THE INVENTION

The present invention relates to improvements in the field of carbon nanotube production. More particularly, the invention relates to an improved method and apparatus for producing single-wall carbon nanotubes.

BACKGROUND OF THE INVENTION

Carbon nanotubes are available either as multi-wall or single-wall nanotubes. Multi-wall carbon nanotubes have exceptional properties such as excellent electrical and thermal conductivities. They have applications in numerous fields such as storage of hydrogen (C. Liu, Y. Y. Fan, M. Liu, H. T. Cong, H. M. Cheng, M. S. Dresselhaus, Science 286 (1999), 1127; M. S. Dresselhaus, K. A Williams, P. C. Eklund, MRS Bull. (1999), 45) or other gases, adsorption heat pumps, materials reinforcement or nanoelectronics (M. Menon, D. Srivastava, Phy. Rev. Lett. 79 (1997), 4453). Single-wall carbon nanotubes, on the other hand, possess properties that are significantly superior to those of multi-wall nanotubes. However, single-wall carbon nanotubes are available only in small quantities since known methods of production do not produce more than few grams per day of these nanotubes. For any industrial application such as storage or material reinforcement, the amount of single-wall carbon nanotubes produced must be at least a few kilograms per day.

Nowadays, the most popular methods for producing single-wall carbon nanotubes are laser ablation, electric arc and chemical vapor deposition (CVD). The two first methods are based on the same principal: local evaporation of a graphite target enriched with a metal catalyst and subsequent condensation of the vapor to form nanotubes (A. A. Puretzky, D. B. Geohegan, S. J. Pennycook, Appl. Phys. A 70 (2000), 153). U.S. Pat. No. 6,183,714 discloses a method of making ropes of single-wall carbon nanotubes using a laser pulse to produce a vapor containing carbon and one or more Group VIII transition metals. U.S. Pat. No. 5,424,054 discloses a process for producing hollow carbon fibers having wall consisting essentially of a single layer of carbon atoms using an electric arc. The process involves contacting carbon vapor with cobalt vapor under specific conditions, and is thus limited to the use of cobalt vapor.

Although the above methods are relatively efficient for the transformation of carbon into nanotubes, they have inherent drawbacks. The vaporisation of graphite is not energetically advantageous since 717 kJ are required to evaporate one mole of carbon. Therefore, the production of single-wall carbon nanotubes via laser ablation and electric arc consumes a lot of energy for small quantities of nanotubes produced. Moreover, these processes are non-continuous since they must be stopped for renewing the source of carbon once the graphite has been consumed.

In the CVD method as well as in the other two methods described above, the metal catalyst plays a key role in the synthesis of the nanotubes. For example, in the CVD method, the carbon-containing gas is decomposed by the particles of metal catalyst on which the nanotubes form. The CVD method suffers from a major drawback since the encapsulation of the catalyst particles by carbon stops the growth of the nanotubes (R. E. Smalley et al. Chem. Phys. Lett. 296 (1998), 195). In addition, due to the non-selectivity of the method, nanotubes having two, three or multi-walls are obtained at the same time as the single-wall nanotubes.

A promising method for the production of single-wall carbon nanotubes involves the use of a plasma torch for decomposing a mixture of carbon-containing substance and a metal catalyst and then condensing the mixture to obtain single-wall carbon nanotubes. This method has been recently described by O, Smiljanic, B. L. Stansfield, J.-P. Dodelet, A. Serventi, S. Desilets, in Chem. Phys. Lett. 356 (2002), 189 and showed encouraging results. Such a method, however, has an important drawback since a premature extinction of the plasma torch occurs due to a rapid formation of carbon deposit in the torch. This method is therefore non-continuous and requires removal of the carbon deposit. Thus, large quantities of single-wall carbon nanotubes cannot be produced.

SUMMARY OF THE INVENTION

It is therefore an object of the present invention to overcome the above drawbacks and to provide a method and apparatus for the continuous production of single-wall carbon nanotubes in large quantities.

According to a first aspect of the invention, there is provided a method for producing single-wall carbon nanotubes, comprising the steps of:

a) providing a plasma torch having a plasma tube with a plasma-discharging end;

b) feeding an inert gas through the plasma tube to form a primary plasma;

c) contacting a carbon-containing substance and a metal catalyst with the primary plasma at the plasma-discharging end of the plasma tube, to form a secondary plasma containing atoms or molecules of carbon and atoms of metal catalyst; and d) condensing the atoms or molecules of carbon and the atoms of metal catalyst to form single-wall carbon nanotubes.

According to a second aspect of the invention, there is provided a method for producing single-wall carbon nanotubes, comprising the steps of:

a) providing a plasma torch having a plasma tube with a plasma-discharging end;

b) feeding an inert gas and an inorganic metal catalyst through the plasma tube to form a primary plasma containing the atoms of metal catalyst;

c) contacting a carbon-containing substance with the primary plasma at the plasma-discharging end of said plasma tube, to form a secondary plasma containing atoms or molecules of carbon and the atoms of metal catalyst; and d) condensing the atoms or molecules of carbon and the atoms of metal catalyst to form single-wall carbon nanotubes.

According to a third aspect of the invention, there is provided an apparatus for producing single-wall carbon nanotubes, which comprises:

a plasma torch having a plasma tube for receiving an inert gas so as to form a primary plasma, the plasma tube having a plasma-discharging end;

a feeder for directing a carbon-containing substance and a metal catalyst towards the primary plasma so that the carbon-containing substance and the metal catalyst contact the primary plasma at the plasma-discharging end of the plasma tube, to thereby form a secondary plasma containing atoms or molecules of carbon and the atoms of the metal catalyst; and a condenser for condensing the atoms or molecules of carbon and the atoms of the metal catalyst to form single-wall carbon nanotubes.

According to a fourth aspect of the invention, there is provided an apparatus for producing single-wall carbon nanotubes, which comprises:

a plasma torch having a plasma tube for receiving an inert gas and an inorganic metal catalyst so as to form a primary plasma containing atoms of the metal catalyst, the plasma tube having a plasma-discharging end;

a feeder for directing a carbon-containing substance towards the primary plasma so that the carbon-containing substance contacts the primary plasma at the plasma-discharging end of the plasma tube, to thereby form a secondary plasma containing atoms or molecules of carbon and the atoms of the metal catalyst; and a condenser for condensing the atoms or molecules of carbon and the atoms of the metal catalyst to form single-wall carbon nanotubes.

Applicant has found quite surprisingly that by feeding the carbon-containing substance separately from the inert gas used to generate the primary plasma so that the carbon-containing substance contacts the primary plasma at the plasma-discharging end of the plasma tube to form the aforesaid secondary plasma, there is no undesirable formation of carbon deposit adjacent the plasma-discharging end of the plasma tube. Thus, no premature extinction of the plasma torch.

The term "carbon-containing substance" as used herein refers to a substance which contains carbon atoms. Preferably, such a substance does not contain nitrogen atoms. The carbon-containing substance can be a solid, a liquid or a gas.

The expression "organometallic complex" as used herein refers to a compound in which there is a bonding interaction (ionic or covalent, localized or delocalized) between one or more carbon atoms of an organic group or molecule with a main group, transition, lanthanide, or actinide metal atom or atoms.

The expression "rapid condensation" as used herein refers to a condensation which occurs at a rate of at least $10^5$K/second.

DETAILED DESCRIPTION OF THE INVENTION

In the method according to the first aspect of the invention, step (c) can be carried out by separately directing the carbon-containing substance and the metal catalyst towards the primary plasma. The carbon-containing substance can be in admixture with a carrier gas. Preferably, the carbon-containing substance is in liquid or gaseous phase and the carbon-containing substance in liquid or gaseous phase flows along a helical path prior to contacting the primary plasma. The carbon-containing substance in liquid or gaseous phase is preferably in admixture with a carrier gas. It is also possible to use a carbon-containing substance in solid phase, in admixture with a carrier gas; such a mixture preferably flows along a helical path prior to contacting the primary plasma. The metal catalyst can also be in admixture with a carrier gas. When use is made of a metal catalyst in liquid or gaseous phase, such a metal catalyst preferably flows along a helical path prior to contacting the primary plasma. The metal catalyst in liquid or gaseous phase is preferably in admixture with a carrier gas. It is also possible to use a metal catalyst in solid phase, in admixture with a carrier gas; such a mixture preferably flows along a helical path prior to contacting the primary plasma.

Step (c) of the method according to the first aspect of the invention can also be carried out by directing a mixture of the carbon-containing substance and the metal catalyst towards the primary plasma. The latter mixture can be in admixture with a carrier gas. Preferably, the carbon-containing substance and the metal catalyst are in liquid or gaseous phase and the latter two flow along a helical path prior to contacting the primary plasma. The carbon-containing substance and the metal catalyst in liquid or gaseous phase are preferably in admixture with a carrier gas. It is also possible to use the carbon-containing substance and the metal catalyst in solid phase, in admixture with a carrier gas; such a mixture preferably flows along a helical path prior to contacting the primary plasma.

The metal catalyst used in the method according to the first aspect of the invention is preferably an organometallic complex. It is also possible to use, as a metal catalyst, an inorganic metal complex or an inorganic metal catalyst comprising at least one metal in metallic form. Examples of suitable metal catalyst include those comprising at least one metal selected from the group consisting of Fe, Ru, Co, Rh, Ir, Ni, Pd, Pt, Y, La, Ce, Mn, Li, Pr, Nd, Tb, Dy, Ho, Er, Lu and Gd. The metal is preferably iron.

The metal catalyst can also comprise cobalt and at least one metal selected from the group consisting of Ni, Fe, Y, Pt, Mo, Cu, Pb and Bi. Alternatively, the metal catalyst can comprise nickel and at least one metal selected from the group consisting of Fe, Y, Lu, Pt, B, Ce, Mg, Cu and Ti.

Ferrocene, iron (II) phthalocyanine, iron in metallic form, iron pentacarbonyl and mixtures thereof can be used as suitable metal catalyst. Ferrocene is preferred.

In the method according to the first aspect of the invention, it is possible to use the inert gas in admixture with an inorganic metal catalyst which may be the same or different than the one used in step (c).

In the method according to the second aspect of the invention, step (c) can be carried out by directing the carbon-containing substance towards the primary plasma. The carbon-containing substance can be in admixture with a carrier gas. Preferably, the carbon-containing substance is in liquid or gaseous phase and the carbon-containing substance in liquid or gaseous phase flows along a helical path prior to contacting the primary plasma. The carbon-containing substance in liquid or gaseous phase is preferably in admixture with a carrier gas. It is also possible to use a carbon-containing substance in solid phase, in admixture with a carrier gas; such a mixture preferably flows along a helical path prior to contacting the primary plasma.

The inorganic metal catalyst used in the method according to the second aspect of the invention can be an inorganic metal complex or at least one metal in metallic form. Preferably, the inorganic metal catalyst comprises at least one metal selected from the group consisting of Fe, Ru, Co, Ph, Ir, Ni, Pd, Pt, Y, La, Ce, Mn, Li, Pr, Nd, Tb, Dy, Ho, Er, Lu and Gd. The metal is preferably iron. The inorganic metal catalyst can also comprise cobalt and at least one metal selected from the group consisting of Ni, Fe, Y, Pt, Mo, Cu, Pb and Bi. Alternatively, the inorganic metal catalyst can comprise nickel and at least one metal selected from the group consisting of Fe, Y, Lu, Pt, B, Ce, Mg, Cu and Ti.

The carbon-containing substance used in the method according to the first or the second aspect of the invention can be a carbon-containing gas, a carbon-containing liquid or a carbon-containing solid. It is also possible to use a mixture of a carbon-containing gas and a carbon-containing liquid, a mixture of a carbon-containing gas and a carbon-containing solid, a mixture of a carbon-containing liquid and a carbon-containing solid or a mixture of a carbon-containing gas, a carbon-containing liquid and a carbon-containing solid. Preferably, the carbon-containing gas is a $C_1$-$C_4$ hydrocarbon such as methane, ethane, ethylene, acetylene, propane, propene, cyclopropane, allene, propyne, butane, 2-methylpropane, 1-butene, 2-butene, 2-methylpropene, cyclobutane, methylcyclopropane, 1-butyne, 2-butyne, cyclobutene, 1,2-butadiene, 1,3-butadiene or 1-buten-3-yne or a mixture thereof. When commercial acetylene is used, care should be taken to filter such a gas in order to remove impurities. The carbon-containing liquid is preferably a $C_5$-$C_{10}$ hydrocarbon. Alternatively, the carbon-containing liquid can be selected from the group consisting of pentane, hexane, cyclohexane, heptane, benzene, toluene, xylene or styrene or mixtures thereof. The carbon-containing solid can be graphite, carbon black, norbornylene, naphthalene, anthracene, phenanthrene, polyethylene, polypropylene, or polystyrene or mixtures thereof. Graphite is preferred. More preferably, the graphite is in the form of a nano-powder.

The inert gas used in the method according to the first or second aspect of the invention can be helium, argon or a mixture thereof. Argon is preferred. A further inert gas can be injected in the plasma torch and directed towards the primary and secondary plasmas. A cooling inert gas is preferably injected downstream of the secondary plasma; the cooling inert gas can be helium, argon or a mixture thereof. The cooling inert gas assists in providing a temperature gradient. The aforementioned carrier gas can be helium, argon, hydrogen or hydrogen sulfide or a mixture thereof. Argon is preferably used as carrier gas.

According to a preferred embodiment, the metal catalyst and the carbon-containing substance are used in an atomic ratio metal atoms/carbon atoms of about 0.01 to about 0.06. More preferably, the atomic ratio metal atoms/carbon atoms is about 0.02.

Step (d) of the method according to the first or second aspect of the invention is preferably carried out to provide a temperature gradient permitting rapid condensation of the atoms or molecules of carbon and the atoms of metal catalyst. Preferably, the temperature gradient is provided by directing the atoms or molecules of carbon and the atoms of metal catalyst through an oven disposed downstream of the plasma tube in spaced relation thereto, the oven being heated at a predetermined temperature. The predetermined temperature can be comprised between 500 and 1800° C. and preferably between 800 and 950° C. A temperature of about 900° C. is preferred. Such a temperature of about 900° C. is also particularly preferred when the metal catalyst comprises iron. The single-wall carbon nanotubes produced can be collected in a trap such as an electrostatic trap.

In the apparatus according to the third aspect of the invention, the feeder preferably comprise a first conduit for directing the carbon-containing substance towards the primary plasma and a second conduit for directing the metal catalyst towards the primary plasma. Preferably, the first and second conduits each have a discharge end disposed adjacent the plasma-discharging end of the plasma tube. Alternatively, the feeder can comprise a single conduit for directing a mixture of the carbon-containing substance and the metal catalyst towards the primary plasma. In such a case, the single conduit preferably has a discharge end disposed adjacent the plasma-discharging end of the plasma tube. In a particularly preferred embodiment, the single conduit is disposed inside the plasma tube and extends substantially coaxially thereof.

In the apparatus according to the fourth aspect of the invention, the feeder preferably comprises a single conduit for directing the carbon-containing substance towards the primary plasma. Preferably, the conduit has a discharge end disposed adjacent the plasma-discharging end of the plasma tube. In a particularly preferred embodiment, the conduit is disposed inside the plasma tube and extends substantially coaxially thereof.

In the apparatus according to the third or fourth aspect of the invention, the condenser preferably comprise an oven disposed downstream of the plasma tube in spaced relation thereto, and a heat source for heating the oven to provide a temperature gradient permitting rapid condensation of the atoms or molecules of carbon and the atoms of metal catalyst. Preferably, a heat-resistant tubular member having a plasma-receiving end extends through the oven with the plasma-receiving end disposed upstream of the plasma-discharging end of the plasma tube. An injector is provided for injecting a cooling inert gas into the tubular member, downstream of the secondary plasma; the cooling inert gas assists in providing the temperature gradient. The heat-resistant tubular member can be made of quartz or boron nitride. The apparatus can be provided with a trap for collecting single-wall carbon nanotubes produced. Preferably, the trap is an electrostatic trap. The apparatus can also be provided with a cooling system disposed about the plasma tube and extends substantially coaxially thereof. Preferably, the apparatus comprises a Faraday shield made of a conductive material for preventing emission of electromagnetic radiations outside of the apparatus.

Where the apparatus according to the third or fourth aspect of the invention has the aforementioned conduit disposed inside the plasma tube and extending substantially coaxially thereof, the apparatus preferably includes another heat-resistant tubular member disposed about the plasma tube and extending substantially coaxially thereof, and an injector for injecting a further inert gas between the plasma tube and the tubular member to prevent undesirable formation of carbon deposit adjacent the plasma-discharging end of the plasma tube. The latter heat-resistant tubular member can also be made of quartz or boron nitride.

BRIEF DESCRIPTION OF THE DRAWINGS

Further features and advantages of the invention will become more readily apparent from the following description of preferred embodiments as illustrated by way of examples in the appended drawings wherein.

DESCRIPTION OF PREFERRED EMBODIMENTS

Figure 1:
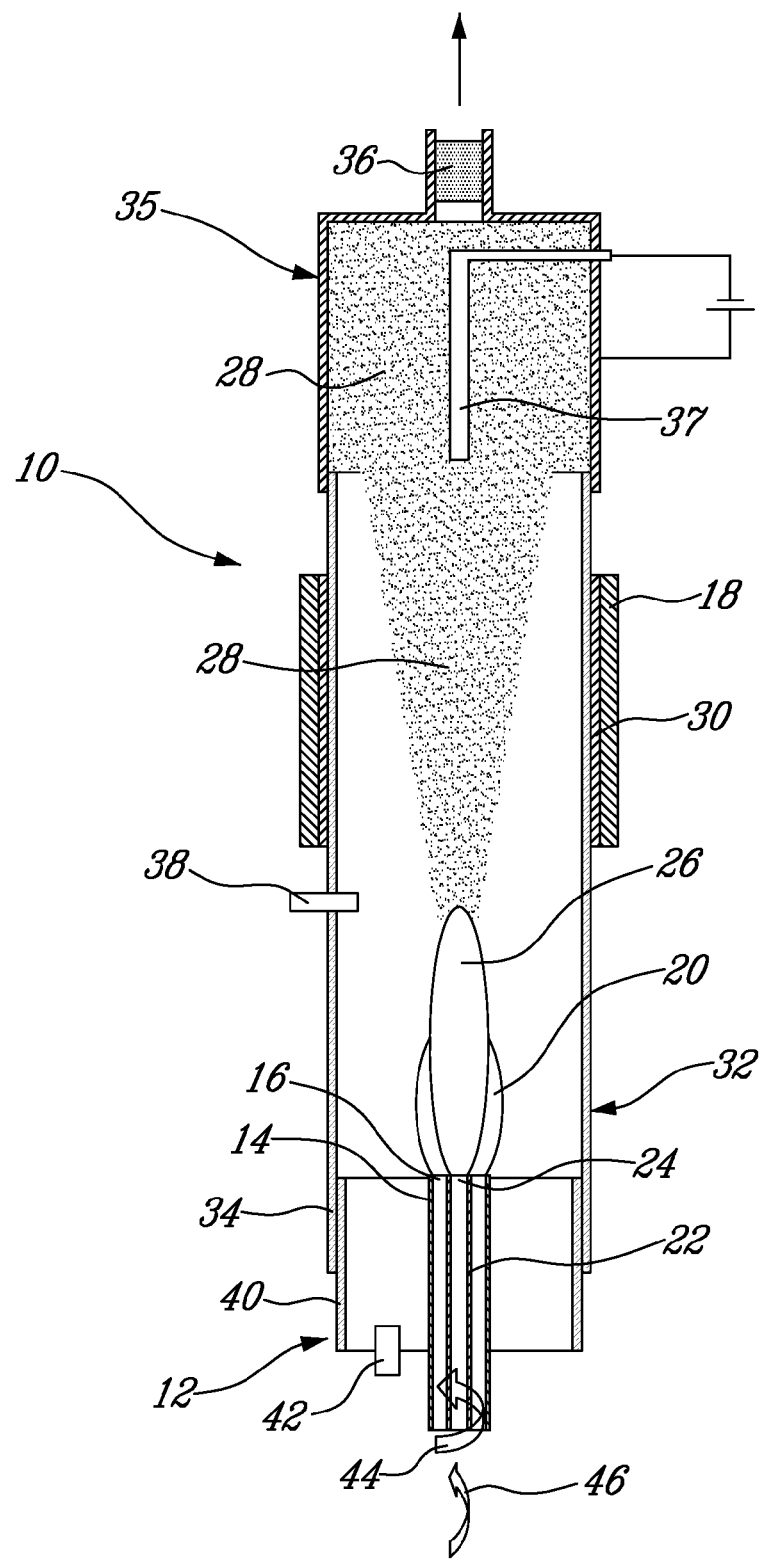
FIG. 1 is a schematic, sectional elevation view of an apparatus for producing single-wall carbon nanotubes, according to a first preferred embodiment of the invention.

Referring first to FIG. 1, there is shown an apparatus 10 for producing single-wall carbon nanotubes, which comprises a plasma torch 12 having a plasma tube 14 with a plasma-discharging end 16, and an oven 18 disposed downstream of the plasma tube 14 in spaced relation thereto. The plasma tube 14 is adapted to receive an inert gas for activation by electromagnetic radiation generated from a source (not shown) so as to form a primary plasma 20. The electromagnetic radiations are propagated on the plasma tube 14 so as to maintain the primary plasma 20. The primary plasma 20 comprises ionized atoms of the inert gas. A feed conduit 22 having a discharge end 24 is arranged inside the plasma tube 14 and extends substantially coaxially thereof. The discharge end 24 of the feed conduit 22 is disposed adjacent the plasma discharging end 16 of the plasma tube 14. The feed conduit 22 serves to direct a carbon-containing substance, such as a carbon-containing gas, and a metal catalyst towards the primary plasma 20 so that the carbon-containing substance and the metal catalyst contact the primary plasma 20 at the plasma-discharging end 16 of the plasma tube 14, whereby to form a secondary plasma 26 containing atoms or molecules of carbon and the atoms of metal catalyst. The carbon-containing gas is preferably ethylene or methane.

The oven 18 serves to condense the atoms or molecules of carbon and atoms of metal catalyst to form single-wall carbon nanotubes 28. A heat source 30 is provided for heating the oven 18 to generate a temperature gradient permitting rapid condensation of the atoms or molecules of carbon and the atoms of metal catalyst. A heat-resistant tubular member 32 having a plasma-receiving end 34 extends through the oven 18, the plasma-receiving end 34 being disposed upstream of the plasma-discharging end 16 of the plasma tube 14. An electrostatic trap 35 comprising a filter 36 and a rod 37 is extending downstream of oven 18. The deposit of single-wall carbon nanotubes 28 occurs on the heat-resistant member 32 upstream and downstream of the oven 18, as well as inside of the trap 35. The filter 36 traps some of the fine particles (not shown) generated during the formation of single-wall carbon nanotubes 28 and reduces the emission of fine particles outside of the apparatus. The electrostatic trap 35 permits a more efficient recovery of the single-wall nanotubes produced by the apparatus 10. The apparatus further includes a gas injector 38 for injecting a cooling inert gas into the tubular member 32, downstream of the secondary plasma 26. The cooling inert gas assists in providing the temperature gradient. Another heat-resistant tubular member 40 is disposed about the plasma tube 14 and extends substantially coaxially thereof, the tubular member 40 being fixed to the tubular member 32 and supporting same. Another gas injector 42 is provided for injecting a further inert gas between the plasma tube 14 and the tubular member 40 to prevent undesirable formation of carbon deposit adjacent the plasma-discharging end 16 of the plasma tube 14. The plasma tube 14 is also provided with a cooling system (not shown), which preferably uses water. The apparatus 10 further comprises a Faraday shield (not shown) made of a conductive material, preferably aluminium.

The inert gas flows through the plasma tube 14 along a helical path represented by the arrow 44. Similarly, the carbon-containing gas and the metal catalyst, optionally in admixture with a carrier gas, flow through the feed conduit 22 along a helical path represented by the arrow 46. The metal catalyst which is fed through the conduit 22 can be either an organometallic complex such as ferrocene, or an inorganic metal catalyst such as iron in metallic form. Instead of feeding the metal catalyst through the conduit 22, it is possible to feed only the carbon-containing gas through the conduit 22 and to feed the metal catalyst in admixture with the inert gas through the plasma tube 14. In such a case, the metal catalyst must be an inorganic metal catalyst to prevent undesirable formation of carbon deposit adjacent the plasma-discharging end 16 of the plasma tube 14. It is also possible to feed the inert gas and an inorganic metal catalyst through the plasma tube 14 and to feed the carbon-containing gas in admixture with an organometallic complex or an inorganic metal catalyst through the conduit 22.

Figure 2:
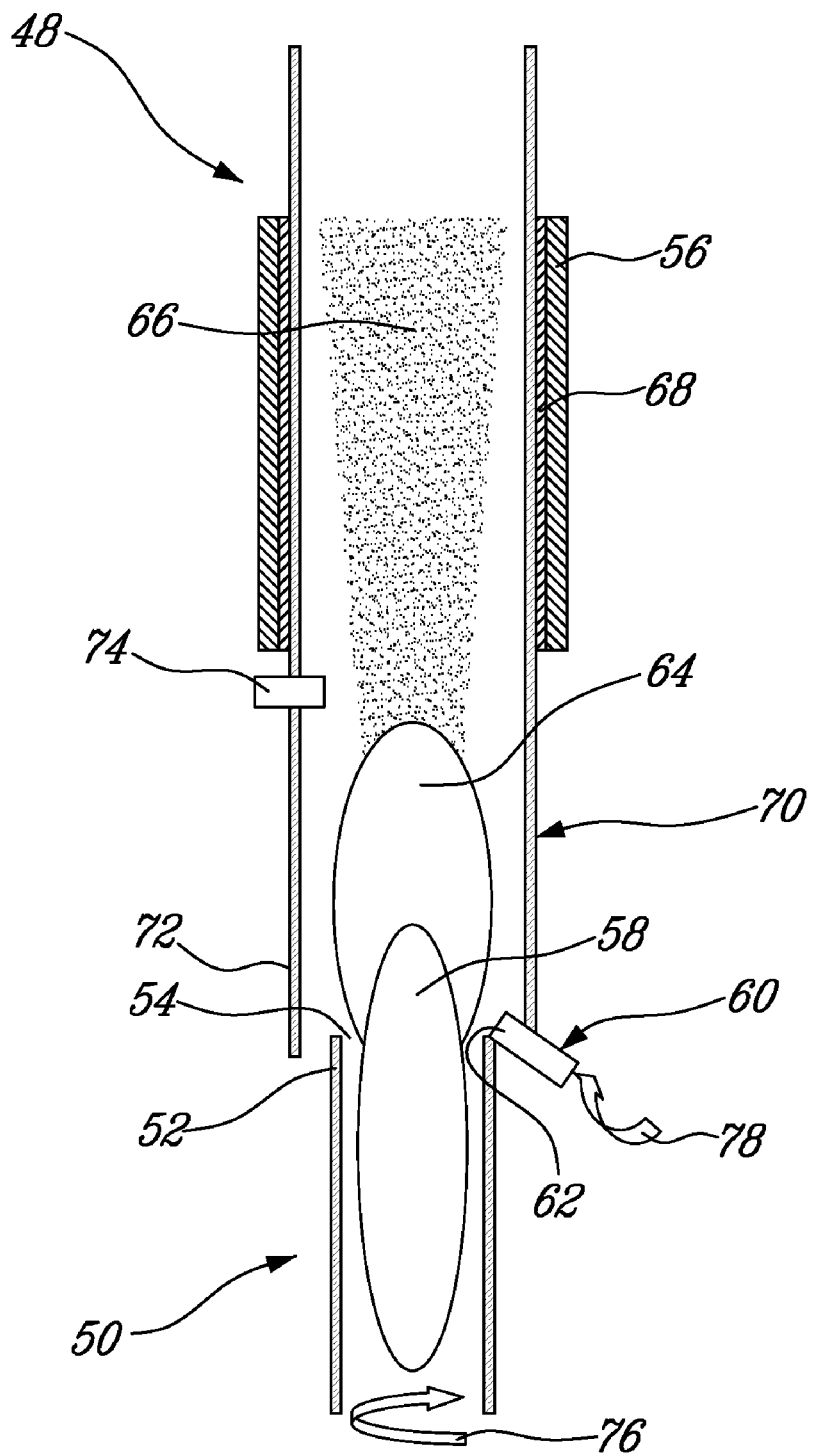
FIG. 2 is a schematic, sectional elevation view of an apparatus for producing single-wall carbon nanotubes, according to a second preferred embodiment of the invention.

FIG. 2 illustrates another apparatus 48 for producing single-wall carbon nanotubes, which comprises a plasma torch 50 having a plasma tube 52 with a plasma-discharging end 54, and an oven 56 disposed downstream of the plasma tube 52 in spaced relation thereto. The plasma tube 52 is adapted to receive an inert gas for activation by electromagnetic radiation generated from a source (not shown) so as to form a primary plasma 58. A feed conduit 60 having a discharge end 62 disposed adjacent the plasma-discharging end 54 of the plasma tube 52 is provided for directing a carbon-containing substance, such as a carbon-containing gas, and a metal catalyst towards the primary plasma 58. The carbon-containing substance and the metal catalyst discharged from the feed conduit 60 contact the primary plasma 58 at the plasma-discharging end 54 of the plasma tube 52, thereby forming a secondary plasma 64 containing atoms or molecules of carbon and the atoms of metal catalyst. The carbon-containing gas is preferably ethylene or methane. Although only one feed conduit 60 is shown in FIG. 2, it is possible to have a plurality of such conduits disposed symmetrically about the plasma tube 52. The plasma tube 52 is also provided with a cooling system (not shown), which preferably uses water. The apparatus 48 further comprises a Faraday shield (not shown) made of a conductive material, preferably aluminium.

The oven 56 serves to condense the atoms or molecules of carbon and the atoms of metal catalyst to form single-wall carbon nanotubes 66. A heat source 68 is provided for heating the oven 56 to generate a temperature gradient permitting rapid condensation of the atoms or molecules of carbon and the atoms of metal catalyst. A heat-resistant tubular member 70 having a plasma-receiving end 72 extends through the oven 56, the plasma-receiving end 72 being disposed upstream of the plasma-discharging end 54 of the plasma tube 52. The apparatus further includes a gas injector 74 for injecting a cooling inert gas into the tubular member 70, downstream of the secondary plasma 64. The cooling inert gas assists in providing the temperature gradient. The deposit of single-wall carbon nanotubes 66 occurs on the heat-resistant tubular member 70 upstream and downstream of the oven 56.

The inert gas flows through the plasma tube 52 along a helical path represented by the arrow 76. Similarly, the carbon-containing gas and the metal catalyst, optionally in admixture with a carrier gas, flow through the conduit 60 along a helical path represented by the arrow 78. The metal catalyst which is fed through the conduit 60 can be either an organometallic complex such as ferrocene, or an inorganic metal catalyst such as iron. Instead of feeding the metal catalyst through the conduit 60, it is possible to feed only the carbon-containing gas through the conduit 60 and to feed the metal catalyst in admixture with the inert gas through the plasma tube 52. In such a case, the metal catalyst must be an inorganic metal catalyst to prevent undesirable formation of carbon deposit adjacent the plasma-discharging end 54 of the plasma tube 52. It is also possible to feed the inert gas and an inorganic metal catalyst through the plasma tube 52 and to feed the carbon-containing gas in admixture with an organometallic complex or an inorganic metal catalyst through the conduit 60. Optionally, the apparatus 48 can be provided with the electrostatic trap 35 illustrated in FIG. 1.

Figure 3:
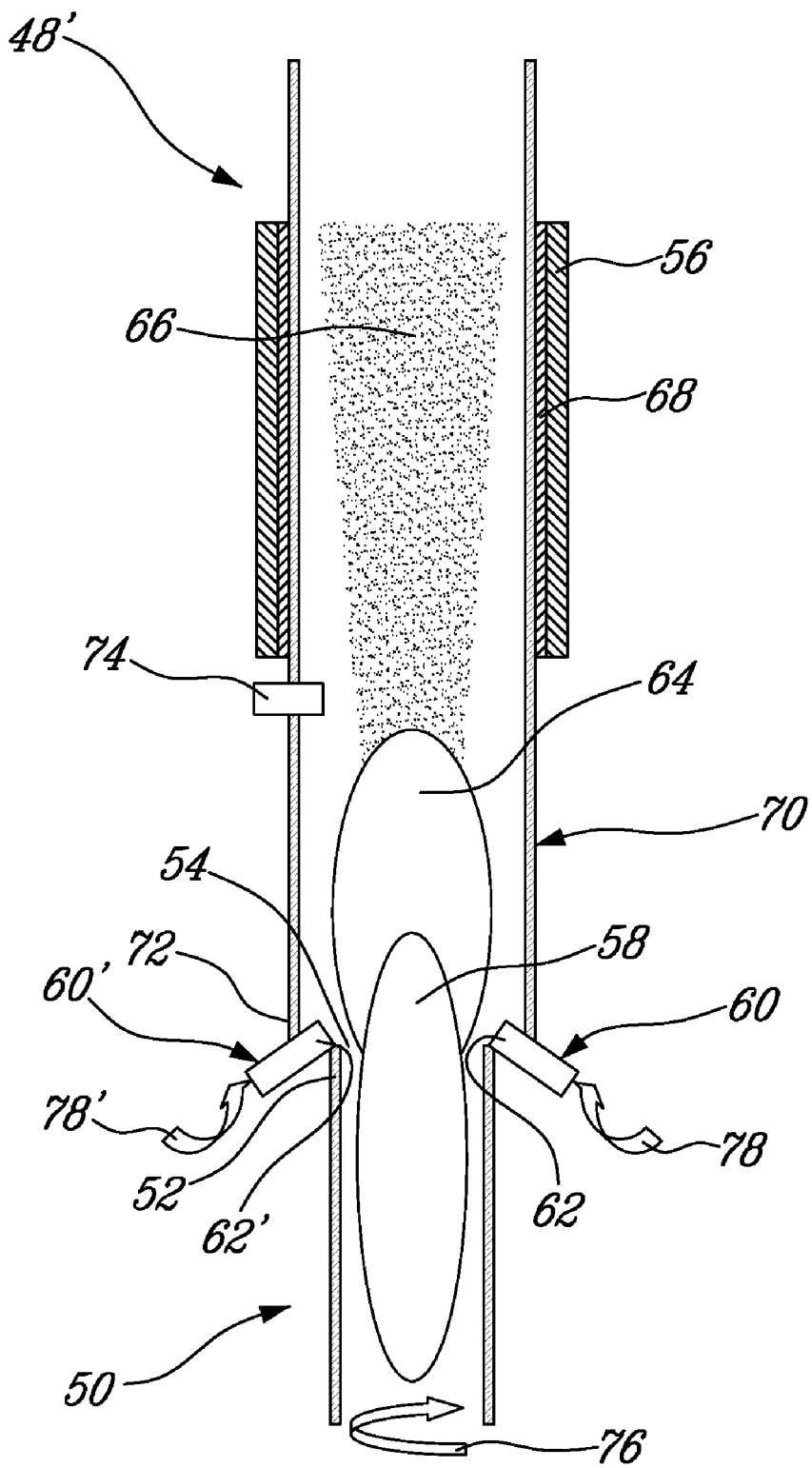
FIG. 3 is a schematic, sectional elevation view of an apparatus for producing single-wall carbon nanotubes, according to a third preferred embodiment of the invention.

The apparatus 48' illustrated in FIG. 3 is similar to the apparatus 48 shown in FIG. 2, with the exception that an additional feed conduit 60' is provided, the feed conduits 60 and 60' being arranged on either side of the plasma tube 52. The conduit 60' has a discharge end 62' disposed adjacent the plasma-discharging end 54 of the plasma tube 52 and serves the same purpose as the feed conduit 60. The carbon-containing gas and the metal catalyst, optionally in admixture with a carrier gas, flow through the conduit 60' along a helical path represented by the arrow 78'. Although two feed conduits 60 and 60' are shown in FIG. 3, it is possible to have a plurality of such conduits disposed symmetrically about the plasma tube 52. Instead of feeding the metal catalyst through the conduits 60 and 60', it is possible to feed only the carbon-containing gas through the conduits 60 and 60' and to feed the metal catalyst in admixture with the inert gas through the plasma tube 52. In such a case, the metal catalyst must be an inorganic metal catalyst to prevent undesirable formation of carbon deposit adjacent the plasma-discharging end 54 of the plasma tube 52. It is also possible to feed the inert gas and an inorganic metal catalyst through the plasma tube 52 and to feed the carbon-containing gas in admixture with an organometallic complex or an inorganic metal catalyst through the conduits 60 and 60'. The plasma tube 52 is also provided with a cooling system (not shown), which preferably uses water. The apparatus 48' further comprises a Faraday shield (not shown) made of a conductive material, preferably aluminium. Optionally, the apparatus 48' can be provided with the electrostatic trap 35 illustrated in FIG. 1.

Figure 4:
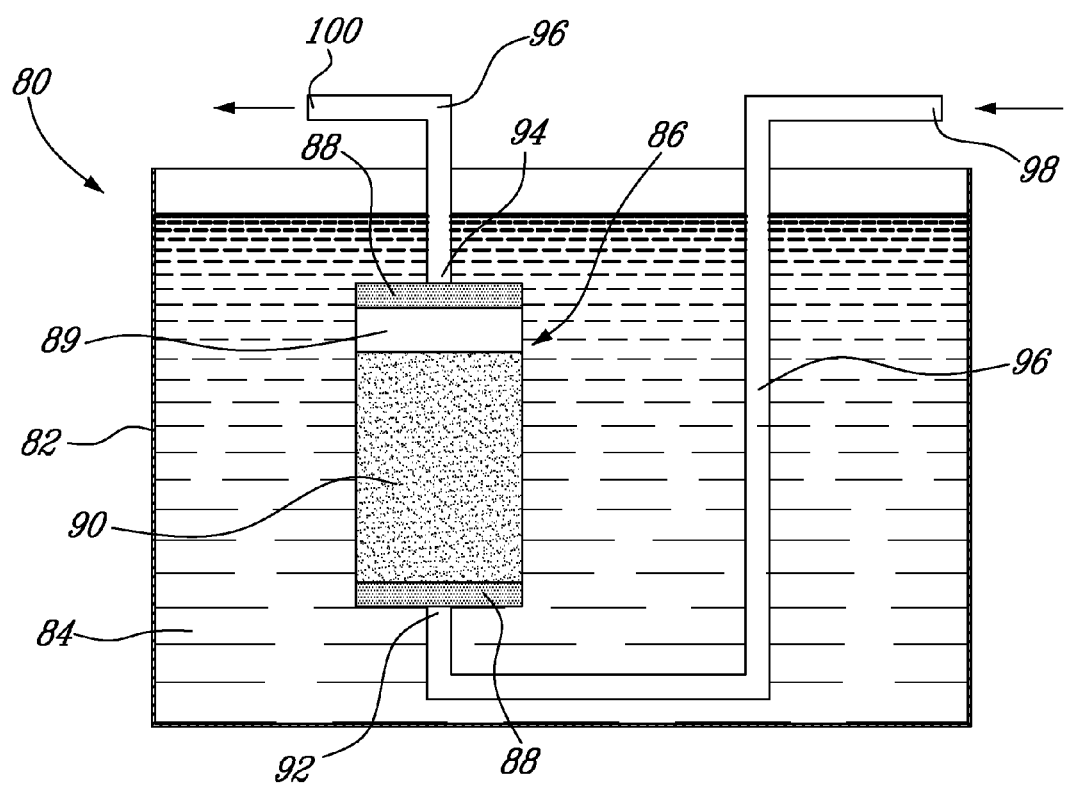
FIG. 4 is a schematic, sectional elevation view of an injecting device according to a fourth preferred embodiment of the invention.

FIG. 4 illustrates an injecting device 80 comprising a reservoir 82 adapted to receive an oil 84, and a reservoir 86 having filters 88. The reservoir 86 is forming a chamber 89 for receiving a metal catalyst 90, preferably ferrocene. The reservoir 86 has an inlet 92 and an outlet 94, which are in fluid flow communication with conduits 96 having an inlet 98 and an outlet 100.

The chamber 89 of the reservoir 86 is provided with a metal catalyst 90 and the catalyst 90 is heated by the hot oil 84 so as to evaporate the metal catalyst 90. A mixture of a carbon-containing gas and a carrier gas (not shown) or a carbon-containing gas is injected at the inlet 98 so as to flow into conduits 96 thereby passing through the reservoir 86 and carrying the evaporated metal catalyst 90 at the outlet 100, which is connected to the apparatus 10, 48 or 48'. The filters 88 prevent solid particles of the metal catalyst 90 from being carried out into said conduits 96.

The following non-limiting example further illustrates the invention.

EXAMPLE

The production or synthesis of single-wall carbon nanotubes has been performed by using a plasma torch as illustrated in FIG. 1. The following experiment has been carried out by the inventors by providing the plasma torch with a cooling system and a Faraday shield. The cooling system prevents the plasma torch from over-heating and being damaged. The Faraday shield comprising a conductive material, preferably aluminium, prevents the electromagnetic radiations from escaping from said apparatus, thereby protecting users of the plasma torch. All the parameters related to the plasma torch are controlled by a computer using the LABVIEW® software. The parameters can also be manually controlled. The inert gas used for generating the primary plasma was argon, the metal catalyst was ferrocene, the carbon-containing gas was ethylene and the cooling gas was helium. Helium was also injected toward the plasma discharging end so as to prevent carbon deposit. The injecting device illustrated in FIG. 4 was used for injecting the ferrocene. Ferrocene was heated to 100° C. and the conduits were heated to 250° C. so as to prevent condensation of ferrocene in the conduit disposed downstream of the reservoir containing the latter metal catalyst. The argon flow varied from 1000 to 3000 sccm (standard cubic centimeters per minute). The helium flows were both stabilized at about 3250 sccm, and the ethylene flow varied between 50 and 100 sccm. The temperature of the oven was kept at 900° C. and measured with a pyrometer. The power of the source generating the electromagnetic radiations (microwaves) was 1000 W and the reflected power was about 200 W. The rod of the electrostatic trap was maintained at a tension of −1000 V. The heat-resistant tubular members were made of quartz.

The plasma tube was made of brass. The feed conduit, on the other hand, was made of stainless steel. The metal catalyst (ferrocene) and the carbon-containing substance (ethylene) were used in an atomic ratio metal atoms/carbon atoms of 0.02. The software controlled the flow of the carrier gas, argon, so as to maintain the atomic ratio at such a value. The experiment was carried out at atmospheric pressure under inert conditions (helium and argon).

The synthesis of single-wall carbon nanotubes was performed for a period of 20 minutes using the above-mentioned experimental conditions. During this period of time, 500 mg of the desired single-wall carbon nanotubes were produced. The purity of the nanotubes thus obtained was about 20%.

Figure 5:
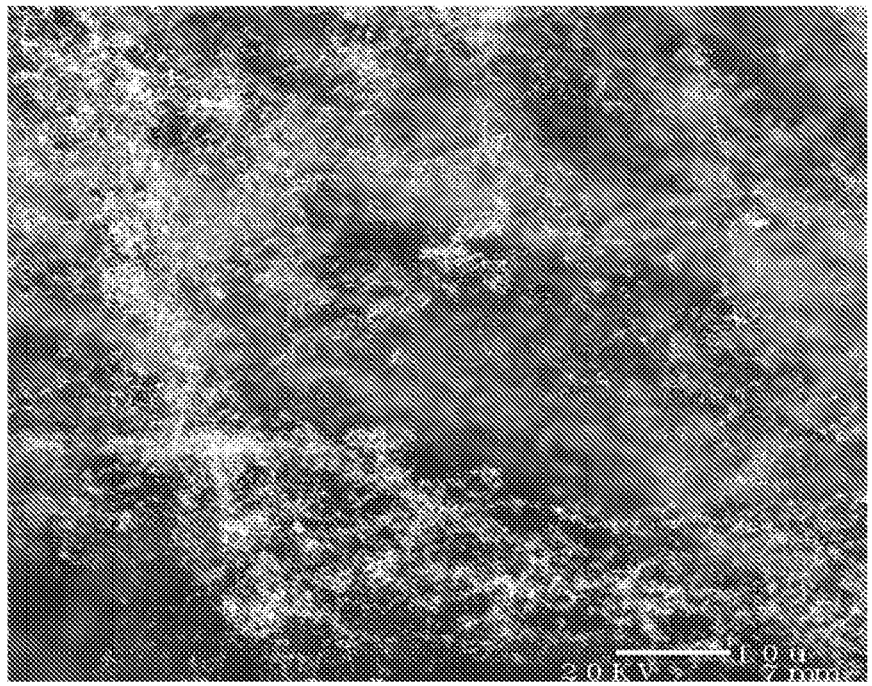
FIG. 5 is a SEM (Scanning Electron Microscope) picture of a crude sample of single-wall carbon nanotubes.
Figure 6:
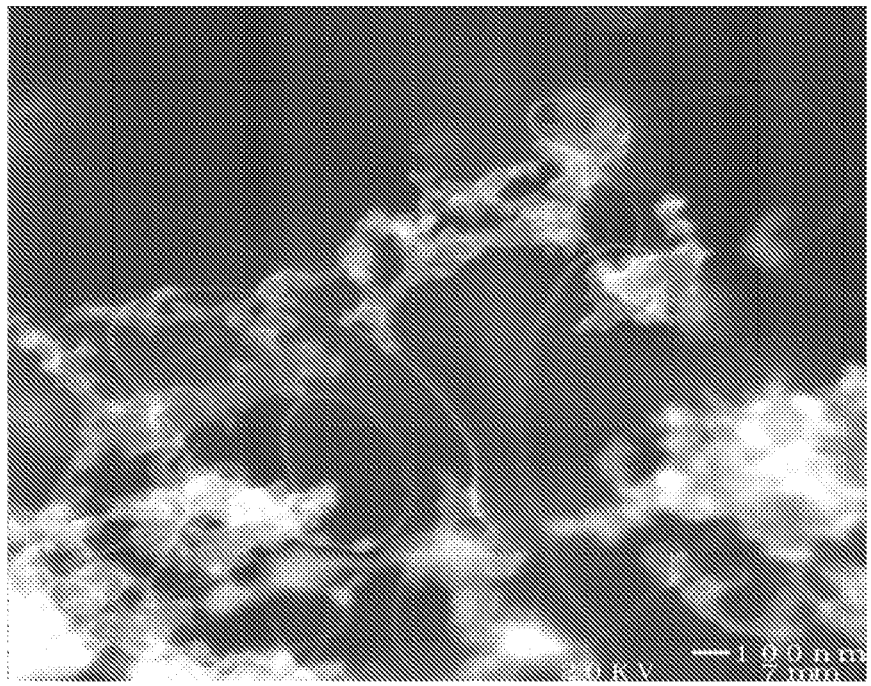
FIG. 6 is another SEM picture of the sample shown in FIG. 5.
Figure 7:
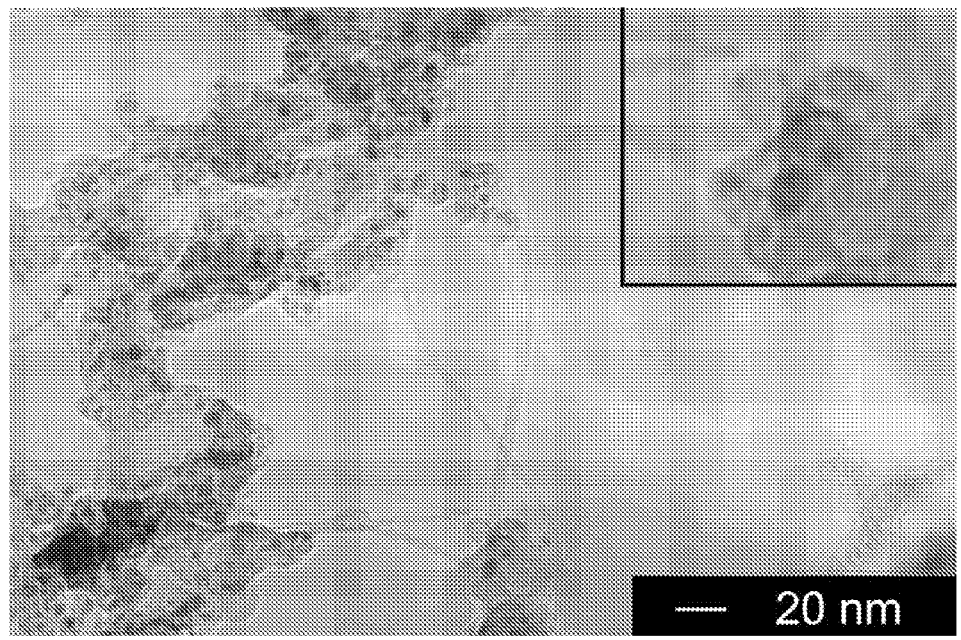
FIG. 7 is a TEM (Transmission Electron Microscope) picture of the sample shown in FIG. 5.
Figure 8:
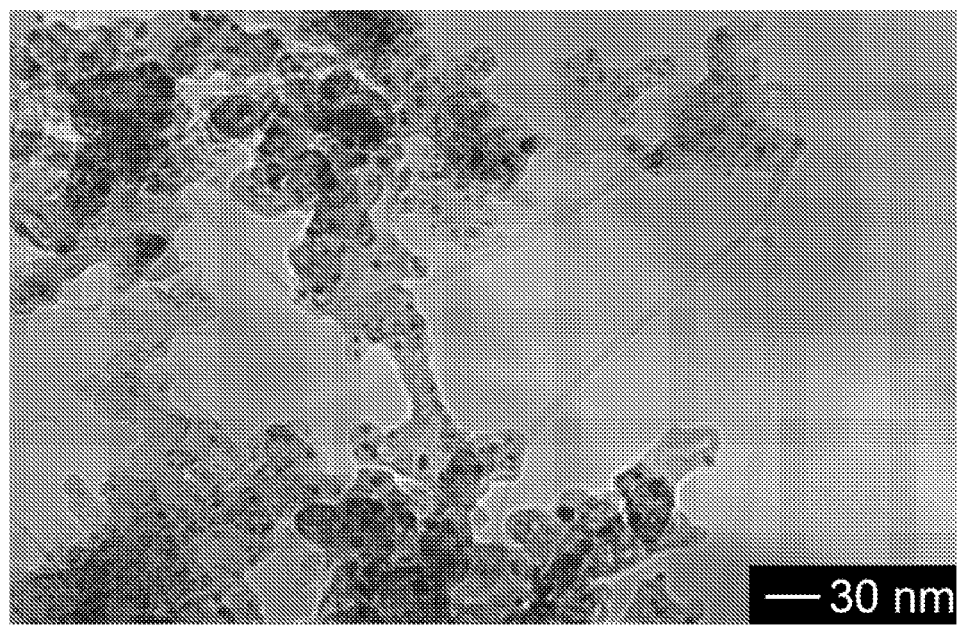
FIG. 8 is another TEM picture of the sample shown in FIG. 5.

The crude sample obtained in the above example was characterized by SEM; the results are illustrated in FIGS. 5 and 6. As it is apparent from FIGS. 5 and 6, single-wall carbon nanotubes were produced. The sample was also characterized by TEM; the results are illustrated in FIGS. 7 and 8. These two figures show that the growth of the single-wall nanotubes is initiated by metal catalyst particles of about 5 nm (indicated by the arrows). The rope-like structure shown in FIGS. 7 and 8 is very common for single-wall nanotubes. The purity of the sample was estimated by comparing the surface occupied by the single-wall carbon nanotubes with the amorphous carbon residues in FIGS. 7 and 8.

Figure 9:
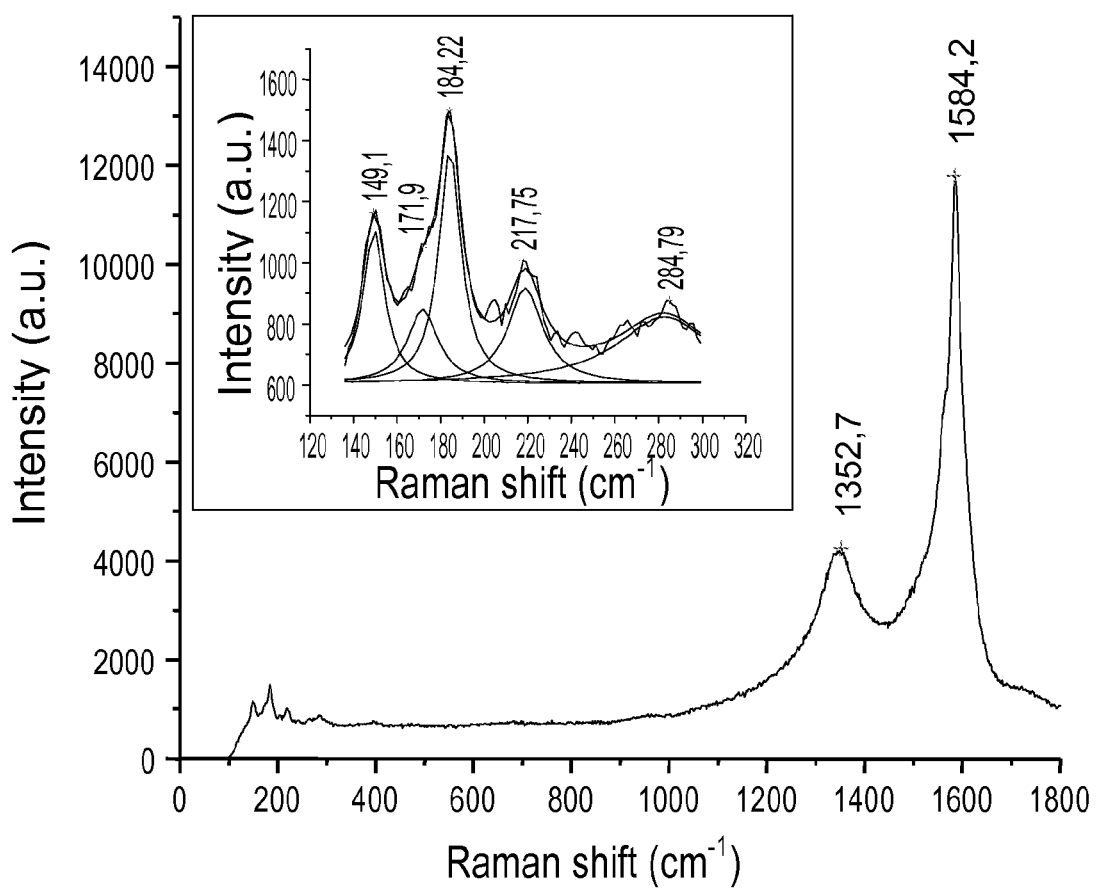
FIG. 9 is the graph of a Raman spectroscopy measurement performed on the sample shown in FIG. 5 using a 514 nm laser.
Figure 10:
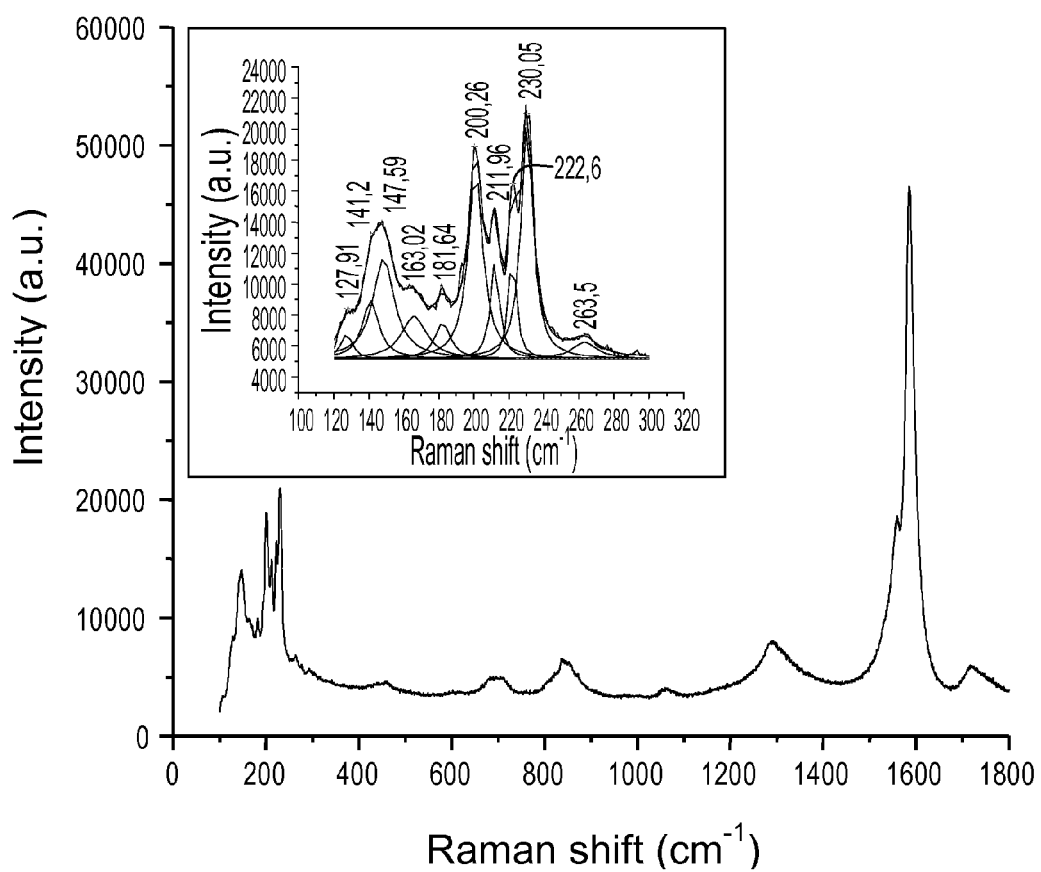
FIG. 10 is the graph of another Raman spectroscopy measurement performed on the sample shown in FIG. 5 using a 782 nm laser.

In order to determine the diameter of the single-wall nanotubes produced according to the above example, two Raman spectroscopy measurements were performed. In the first experiment, a 514 nm laser was used (FIG. 9) whereas, in the second experiment, a 782 nm laser was used (FIG. 10). In FIG. 9, the peaks at 149.10, 171.90, 184.22, 217.75 and 284.79 cm$^{-1}$ correspond to single-wall carbon nanotubes having diameters of 1.50, 1.30, 1.22, 1.03 and 0.80 nm, respectively.

In FIG. 10, the peaks at 127.91, 141.20, 147.59, 163.02, 181.64, 200.26, 211.96, 222.60, 230.05 and 263.57 cm$^{-1}$ correspond to single-wall carbon nanotubes having diameters of 1.75, 1.60, 1.52, 1.37, 1.23, 1.12, 1.06, 1.00, 0.97 and 0.85 nm, respectively.

The above data indicate that in the method according to the example, as opposed to the methods comprising vaporization of graphite, a plurality of single-wall nanotube chiralities was obtained.

It should be noted that by using the method and apparatus of the invention, the production of single-wall carbon nanotubes can be performed for a period of several hours since the deposit of carbon at the plasma-discharging end, leading to the premature extinction of the plasma torch, is avoided.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

What is claimed is:

1. An apparatus for producing single-wall carbon nanotubes, which comprises:
    a plasma torch having a plasma tube adapted to receive an inert gas and form an inert gas plasma, said plasma tube having a plasma-discharging end;
    a feeder comprising a conduit that is disposed inside said plasma tube and that extends substantially coaxially thereof, said conduit having a discharge end disposed at a position chosen from downstream of where said inert gas is introduced into said plasma tube and adjacent to said plasma-discharging end of said plasma tube, said feeder being adapted to direct a carbon-containing substance and a metal catalyst towards said inert gas plasma so that the carbon-containing substance and the metal catalyst contact said inert gas plasma downstream of where said inert gas is introduced in said plasma tube, to thereby form a plasma comprising atoms or molecules of carbon and the atoms of said metal;
    a heat-resistant tubular member disposed about said plasma tube and extending substantially coaxially thereof;
    an injector for injecting a further inert gas between said plasma tube and said tubular member to prevent undesirable formation of carbon deposit adjacent to the plasma-discharging end of said plasma tube; and
    a condenser for condensing the atoms or molecules of carbon and the atoms of said metal to form single-wall carbon nanotubes.

2. The apparatus of claim 1, wherein said condenser comprises an oven disposed downstream of said plasma tube, and a heat source for heating said oven to provide a temperature gradient permitting rapid condensation of the atoms or molecules of carbon and the atoms of said metal.

3. The apparatus of claim 2, further including a heat-resistant tubular member extending through said oven and having a plasma-receiving end disposed upstream of said plasma-discharging end of said plasma tube, and an injector for injecting a cooling inert gas into said tubular member and downstream of the plasma comprising atoms or molecules of carbon and the atoms of said metal, said cooling inert gas assisting in providing the temperature gradient.

4. The apparatus of claim 1, further including a trap for collecting said single-wall carbon nanotubes, said trap being disposed downstream of said condenser, and being in communication with said condenser and said plasma tube.

5. The apparatus of claim 4, wherein said trap is an electrostatic trap.

6. The apparatus of claim 5, wherein said electrostatic trap comprises two electrodes adapted to receive said single-wall carbon nanotubes.

7. The apparatus of claim 6, wherein said electrostatic trap further comprises a filter disposed downstream of said electrodes, said filter being effective for trapping fine particles generated during the formation of single-wall carbon nanotubes.

8. The apparatus of claim 3, further including an electrostatic trap for collecting said single-wall carbon nanotubes, said electrostatic trap being in communication with said condenser and said plasma tube.

9. The apparatus of claim 1, wherein said conduit has a discharge end disposed downstream of where said inert gas is introduced into said plasma tube.

10. The apparatus of claim 1, wherein said conduit has a discharge end disposed adjacently to said plasma-discharging end of said plasma tube.

11. The apparatus of claim 1, wherein said condenser comprises a heat source, disposed downstream of said plasma tube, for providing a temperature gradient permitting rapid condensation of the atoms or molecules of carbon and the atoms of said metal.

12. The apparatus of claim 11, further including an injector for injecting a cooling inert gas assisting in providing the temperature gradient.

13. The apparatus of claim 11, further including an injector for injecting a cooling inert gas into said tubular member and downstream of the plasma comprising atoms or molecules of carbon and the atoms of said metal, said cooling inert gas assisting in providing the temperature gradient.

* * * * *